(12) United States Patent
Chen et al.

(10) Patent No.: US 10,644,935 B2
(45) Date of Patent: May 5, 2020

(54) METHOD FOR CONFIGURING FIBRE CHANNEL STORAGE AREA NETWORK, AND APPARATUS

(71) Applicant: Huawei Technologies Co., Ltd., Shenzhen (CN)

(72) Inventors: Hao Chen, Nanjing (CN); Wei Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 437 days.

(21) Appl. No.: 15/410,951

(22) Filed: Jan. 20, 2017

(65) Prior Publication Data

US 2017/0134220 A1 May 11, 2017

Related U.S. Application Data

(63) Continuation of application No. PCT/CN2015/077466, filed on Apr. 25, 2015.

(30) Foreign Application Priority Data

Jul. 22, 2014 (CN) .......................... 2014 1 0351209

(51) Int. Cl.
*H04L 12/24* (2006.01)
*G06F 3/06* (2006.01)
*H04L 29/08* (2006.01)

(52) U.S. Cl.
CPC ........ *H04L 41/0806* (2013.01); *G06F 3/0607* (2013.01); *H04L 41/0886* (2013.01); *H04L 41/0889* (2013.01); *H04L 67/1097* (2013.01)

(58) Field of Classification Search
CPC ... G06F 3/0607; G06F 3/0664; H04L 41/082; H04L 41/0856; H04L 41/0806; H04L 41/0889; H04L 67/1097; H04L 41/0886
See application file for complete search history.

(56) References Cited

U.S. PATENT DOCUMENTS 6,779,083 B2 8/2004 Ito et al.
7,095,741 B1 * 8/2006 Joshi ................... H04L 12/4641
370/392

(Continued)

FOREIGN PATENT DOCUMENTS

CN 101213818 A 7/2008
CN 102986172 A 3/2013

(Continued)

OTHER PUBLICATIONS

Foreign Communication From A Counterpart Application, European Application No. 15824076.2, European Office Action dated Apr. 12, 2018, 7 pages.

(Continued)

*Primary Examiner* — Kyung H Shin
(74) *Attorney, Agent, or Firm* — Conley Rose, P.C.

(57) ABSTRACT

A method for configuring a fibre channel (FC) storage area network (SAN), and an apparatus, where a first server sends a login request message to a switch, where the login request message includes a first identifier of a first virtual machine (VM) and a world wide group name (WWGN) of a port group of the first VM, enables the switch to establish a correspondence between the first identifier and the WWGN, and enables a storage device to establish the correspondence between the first identifier and the WWGN. A configuration of a first zone and a correspondence of a logical unit number (LUN) are both based on the WWGN. Therefore, in a migration process of the first VM, a network administrator does not need to re-configure a zone, and the storage device does not need to re-configure a correspondence between the first VM and an accessible LUN either.

20 Claims, 5 Drawing Sheets

(56) References Cited

U.S. PATENT DOCUMENTS

| | | | |
|---|---|---|---|
| 7,836,332 B2 * | 11/2010 | Hara | G06F 3/0607 |
| | | | 714/5.11 |
| 2003/0023705 A1 * | 1/2003 | Kim | H04L 41/082 |
| | | | 709/220 |
| 2007/0005820 A1 | 1/2007 | Banzhaf et al. | |
| 2012/0054850 A1 | 3/2012 | Bhardwaj et al. | |
| 2012/0254554 A1 | 10/2012 | Nakajima | |
| 2017/0155599 A1 | 6/2017 | Vobbilisetty et al. | |

FOREIGN PATENT DOCUMENTS

| | | | |
|---|---|---|---|
| CN | 103081435 A | 5/2013 | |
| EP | 1276034 A2 | 1/2003 | |
| EP | 2017711 A2 | 1/2009 | |
| EP | 2723042 A1 | 4/2014 | |

OTHER PUBLICATIONS

Foreign Communication From A Counterpart Application, European Application No. 15824076.2, Extended European Search Report dated Jun. 19, 2017, 9 pages.
Foreign Communication From A Counterpart Application, PCT Application No. PCT/CN2015/077466, English Translation of International Search Report dated Jul. 17, 2015, 2 pages.
Foreign Communication From A Counterpart Application, PCT Application No. PCT/CN2015/077466, English Translation of Written Opinion dated Jul. 17, 2015, 6 pages.
Foreign Communication From A Counterpart Application, Chinese Application No. 201410351209.2, Chinese Office Action dated Feb. 24, 2018, 14 pages.

* cited by examiner

METHOD FOR CONFIGURING FIBRE CHANNEL STORAGE AREA NETWORK, AND APPARATUS

CROSS-REFERENCE TO RELATED APPLICATIONS

This application is a continuation of International Patent Application No. PCT/CN2015/077466 filed on Apr. 25, 2015, which claims priority to Chinese Patent Application No. 201410351209.2 filed on Jul. 22, 2014. The disclosures of the aforementioned applications are hereby incorporated by reference in their entireties.

TECHNICAL FIELD

Embodiments of the present disclosure relate to the field of communications technologies, and in particular, to a method for configuring a fibre channel (FC) storage area network (SAN), and an apparatus.

BACKGROUND

An FC SAN mainly includes nodes, such as servers and a storage devices, provided with a host bus adapter (HBA) card, and an FC Fabric, where the FC Fabric includes several FC switches in a standard mode, the server communicates with the storage device using an FC switch in the FC Fabric, a port through which the server or the storage device is connected to the FC switch is an N_port, and a port through which the FC switch is connected to the server or the storage device is an F_port. Security isolation of the FC SAN may be implemented using a zone technology and a logical unit number (LUN) masking technology, where LUN masking is used to establish a correspondence between a LUN and a world wide port name (WWPN) of the HBA card of the server, that is, a logical unit corresponding to the LUN may be bound to a WWPN of one HBA card or WWPNs of multiple HBA cards such that different servers can access different logical units in the storage device. Therefore, a server and a storage device that belong to a same zone may communicate with each other, and a server and a storage device in different zones cannot directly access each other using the FC Fabric, thereby implementing isolation between devices in the FC SAN.

However, the foregoing zone technology and the LUN masking are only limited to performing network security isolation using a server as a granularity. In a virtualization scenario, each server is loaded with multiple virtual machines (VM). To enable each VM to access a storage device, a WWPN is allocated to each VM, and each VM may be registered with an FC Fabric using an N_port of the server to obtain an N_port identifier (N_Port_ID). Therefore, each VM has an identifier different from that of another VM. With reference to the zone technology and LUN masking, network security isolation may be implemented using a VM as a granularity. However, in a hot migration process of a VM, the VM is required to be capable of accessing a same LUN at different locations before and after being migrated. For example, a VM on a server A (a WWPN of the VM is WWPN-A) needs to undergo hot migration to a server B, and a WWPN of the VM after the VM is migrated to the server B is WWPN-B. A zone configuration before the VM is migrated is performed by configuring WWPN-A and a WWPN of an HBA card of a storage device (designated as WWPN-S) in a same zone (such as ZoneA), and a correspondence between WWPN-A and an LUN of the storage device is set in the storage device. Before the VM is formally migrated, a network administrator configures WWPN-B and WWPN-S in another new zone (such as ZoneB) using a manual configuration. In addition, the storage device also needs to establish a correspondence between WWPN-B and an LUN of the storage device. Therefore, it may be kept that the VM may access an LUN of the storage device after hot migration.

In the prior art, in each migration process of the VM, the network administrator needs to manually configure a new Zone, and the storage device also needs to update a correspondence, causing cumbersome operations such that the VM is relatively low in migration efficiency and is relatively poor in flexibility.

SUMMARY

The present disclosure provides a method for configuring an FC SAN, and an apparatus in order to improve migration efficiency and flexibility of a VM.

According to a first aspect, the present disclosure provides a method for configuring an FC SAN, including sending, by a first server, a login request message to a switch, where the login request message includes a first identifier of a first VM and a world wide group name (WWGN) of a port group of the first VM, the first identifier includes at least one of a WWPN of a first N_port of the first VM or an identifier of the first N_port of the first VM, the first N_port is an N_port that is used on the first server by the first VM, and an N_port that is used on any server by the first VM belongs to the port group of the first VM, and the login request message is used to enable the switch to establish a correspondence between the first identifier and the WWGN, and send, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone, and receiving, by the first server, a login response message sent by the switch, where the login response message is used to notify the first server that the switch has successfully received the login request message.

According to a second aspect, the present disclosure further provides a method for configuring an FC SAN, including receiving, by a switch, a login request message sent by a first server, and sending a login response message to the first server, where the login response message is used to notify the first server that the switch has successfully received the login request message, and the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server, of the first VM belongs to the port group of the first VM, establishing, by the switch, a correspondence between the first identifier and the WWGN according to the login request message, and sending, by the switch according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone.

According to a third aspect, the present disclosure further provides a method for configuring an FC SAN, including receiving, by a storage device belonging to a first zone, a first identifier of a first VM and a WWGN of a port group of the first VM that are sent by a switch according to a configuration of the first zone, where the first identifier includes at least one of a WWPN of a first N_port of the first VM or an identifier of the first N_port of the first VM. The first N_port is an N_port used on a first server by the first VM, and the configuration of the first zone includes the WWGN and a WWPN of an N_port of the storage device, and the configuration of the first zone is used to indicate that the first VM corresponding to the WWGN and the storage device belong to the first zone, and establishing, by the storage device, a correspondence between the first identifier and the WWGN.

According to a fourth aspect, the present disclosure provides a server used in an FC SAN, where the server is a first server, and includes a memory and a processor, where the memory is configured to store program codes, the processor is configured to execute the program codes to implement a method including a sending unit configured to send a login request message to a switch, where the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server by the first VM belongs to the port group of the first VM, and the login request message is used to enable the switch to establish a correspondence between the first identifier and the WWGN, and send, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone, and a receiving unit configured to receive a login response message sent by the switch, where the login response message is used to notify the first server that the switch has successfully received the login request message.

According to a fifth aspect, the present disclosure provides a switch used in an FC SAN, including a memory and a processor, where the memory is configured to store program codes. The processor is configured to execute the program codes to implement a method including receiving a login request message sent by a first server, where the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server, of the first VM belongs to the port group of the first VM, sending a login response message to the first server, where the login response message is used to notify the first server that the switch has successfully received the login request message, and establishing a correspondence between the first identifier and the WWGN according to the login request message, where sending, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone.

According to a sixth aspect, an embodiment of the present disclosure provides a storage device used in an FC SAN, where the storage device belongs to a first zone, and includes a memory and a processor, where the memory is configured to store program codes. The processor is configured to execute the program codes to implement a method including receiving a first identifier of a first VM and a WWGN of a port group of the first VM that are sent by a switch according to a configuration of the first zone, where the first identifier includes at least one of a WWPN of a first N_port of the first VM or an identifier of the first N_port of the first VM, the first N_port is an N_port used on a first server by the first VM, and the configuration of the first zone includes the WWGN and a WWPN of an N_port of the storage device, and the configuration of the first zone is used to indicate that the first VM corresponding to the WWGN and the storage device belong to the first zone, and a processing unit configured to establishing a correspondence between the first identifier and the WWGN.

According to the method for configuring an FC SAN, and the apparatus that are provided in embodiments of the present disclosure, a first server sends a login request message to a switch, where the login request message includes a first identifier of a first VM and a WWGN of a port group of the first VM, an N_port used on any server by the first VM belongs to the port group of the first VM, and the login request message enables the switch to establish a correspondence between the first identifier of the first VM and the WWGN, and send the first identifier and the WWGN to a storage device according to a configuration of a first zone, and enables the storage device to establish the correspondence between the first identifier and the WWGN. The configuration of the first zone in the switch is about the WWGN, and the correspondence configured in the storage device is also about the WWGN. Therefore, in each migration process of the first VM, a network administrator does not need to re-configure a zone, and the storage device does not need to re-configure a correspondence between the first VM and an accessible LUN either such that migration efficiency and flexibility of the VM are improved.

BRIEF DESCRIPTION OF DRAWINGS

To describe the technical solutions in the embodiments of the present disclosure more clearly, the following briefly describes the accompanying drawings required for describing the embodiments.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure.

In embodiments provided in the present disclosure, at least one VM may be configured on a server, the server may perform virtualization based on one N_port to obtain multiple N_ports, and a corresponding N_port is allocated to each VM such that each VM configured on the server has an N_port belonging to the VM, and the N_port is referred to as an N_port used on the server by the VM. Description is provided using a VM on the server as an example. If an N_port of the VM may support a port group attribute, when the VM is configured on the server, a VM manager allocates a WWPN and a WWGN to the VM, where the WWPN is a port name of an N_port used on the server by the VM, and the WWGN is a group name of a port group of the VM. The port group refers to a set of WWPNs of one or more N_ports used by a same VM in a life cycle (such as in a migration process), members in the port group are inaccessible to each other, that is, N_ports belonging to a same port group are isolated from each other, the WWGN of the port group may be used to identify a group of ports used by a same VM when accessing a storage device at different locations in an FC SAN, that is, each N_port used on any server by the VM belongs to the port group of the VM. Therefore, one VM may correspond to one WWGN, and one WWGN may include at least one WWPN. In the embodiments of the present disclosure, a zone is set using a WWGN of a VM. Therefore, a network administrator may perform partition to place the WWGN, and a WWPN of an N_port of a storage device with which the VM needs to communicate into a same zone, and members in the zone include the WWGN, and the WWPN of the N_port of the storage device with which the VM communicates. In this embodiment, an example in which a VM communicates with a storage device is used, that is, a configuration of a zone={a WWGN, a WWPN of an N_port of a storage device}, and the network administrator configures the zone obtained through partition into a switch.

Figure 1:
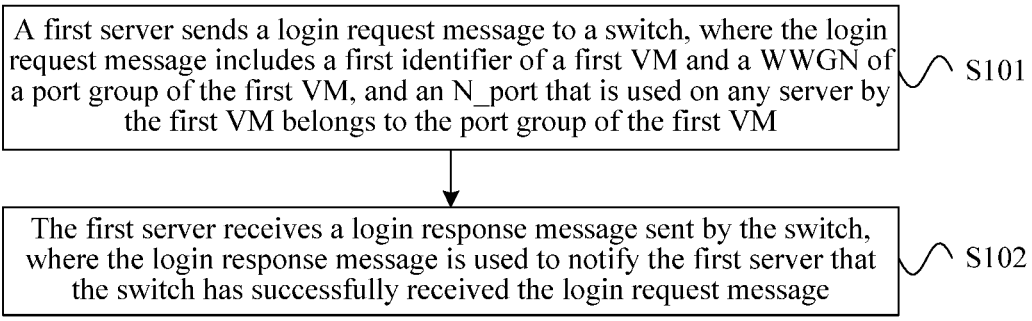
FIG. 1 is a flowchart of Embodiment 1 of a method for configuring an FC SAN according to the present disclosure.

FIG. 1 is a flowchart of Embodiment 1 of a method for configuring an FC SAN according to the present disclosure. This embodiment is performed by a first server, and the first server may be any server in the FC SAN. As shown in FIG. 1, the method in this embodiment may include the following steps.

Step S101: The first server sends a login request message to a switch, where the login request message includes a first identifier of a first VM and a WWGN of a port group of the first VM, and an N_port that is used on any server by the first VM belongs to the port group of the first VM.

Step S102: The first server receives a login response message sent by the switch, where the login response message is used to notify the first server that the switch has successfully received the login request message.

In this embodiment, because one VM corresponds to one type of service, a network administrator may determine a storage device corresponding to this type of service, and then the network administrator may record a WWGN corresponding to the VM and a WWPN of an N_port of the determined storage device into a configuration of a same zone. The first VM is any VM of at least one VM that is set on the first server. In this embodiment, each VM that processes a first service on any server may be referred to as the first VM, the network administrator needs to perform partition to place the first VM that processes the first service and a storage device that corresponds to the first service into a same zone, where the zone is referred to as a first zone, and the network administrator may determine that a port group of the VM that processes the first service is a WWGN, and may also determine a WWPN of an N_port of the storage device corresponding to the first service. Then, the network administrator may set a configuration of the first zone that includes the WWGN, and the WWPN of the N_port of the storage device, and the configuration of the first zone indicates that the first VM corresponding to the WWGN and the storage device belong to the first zone. Then, the network administrator configures the first zone on the switch in the FC SAN, and the switch is referred to as an FC switch.

WWPNs of N_ports used on different servers by the first VM are different, but the N_ports used on the different servers by the first VM all belong to a port group of the first VM. Therefore, when the first VM is set on the first server, a VM manager of the first server allocates a WWPN of a first N_port of the first VM to the first VM, and in addition, the VM manager further allocates a WWGN of the port group of the first VM to the first VM. Therefore, the first VM may learn that the WWPN of the first N_port of the first VM belongs to the WWGN. To enable the first VM to communicate, on the first server, with the storage device located in the first zone, the first server may first complete login of the first VM to the switch. A process in which the first server completes login of the first VM to the switch is shown as follows.

The first VM that is set on the first server sends a fabric login request (FLOGI) to an F_port of the switch using the first N_port of the first VM (the first N_port refers to an N_port used on the first server by the first VM), where the FLOGI is used to perform login to the switch in order to acquire an identifier of the first N_port of the first VM (which is briefly referred to as N_Port_ID below). The switch receives, using the F_port, the FLOGI sent by the N_port of the first VM, then allocates the N_Port_ID to the first VM according to the FLOGI and a network situation of the FC SAN, and then sends the N_Port_ID to the first N_port of the first VM using the F_port, and the first VM receives, using the first N_port of the first VM, the N_Port_ID sent by the F_port, to complete login of the first VM to the FC SAN. Then, the first VM sends a port login request (PLOGI) to the F_port of the switch using the first N_port of the first VM, where the PLOGI is used to register the first N_port with the switch, and the switch receives, using the F_port, the PLOGI sent by the first N_port of the first VM, to negotiate a parameter of the first N_port of the first VM, and then sends the parameter to the first N_port of the first VM using the F_port. Therefore, the first VM receives, using the N_port of the first VM, the parameter sent by the F_port in order to complete port login of the first N_port of the first VM. Then, the first VM sends a register node name_port identifier request (RNN_ID) to the F_port of the switch using the N_port of the first VM, after receiving the RNN_ID, the F_port of the switch sends a common transport accept message (CT_ACC) to the first N_port of the first VM in order to notify the first server that the RNN_ID has been successfully received, and the switch establishes a correspondence between a WWPN of the first N_port of the first VM and an identifier of the first N_port of the first VM, and stores the correspondence in a local entry in order to complete login of the WWPN using the identifier of the first N_port. At this time, the first server and the switch complete login of the first VM.

In this embodiment, after the first server and the switch complete login of the first VM, the first server may send a login request message to the switch using the first N_port of the first VM, where the login request message includes a first identifier of the first VM and a WWGN of a port group of the first VM, and the first identifier of the first VM includes at least one of a WWPN of the first N_port of the first VM or an identifier of the first N_port of the first VM. The first VM uses different N_ports on different servers, and therefore the first VM also uses different WWPNs of N_ports and different identifiers of N_ports on different servers. To distinguish N_ports used on different servers by the first VM, an identifier of an N_port used on the first server by the first VM is referred to as the first identifier of the first VM herein, the rest can be deduced by analogy, and an identifier of an N_port used on a second server by the first VM may be also referred to as a second identifier of the first VM.

In this embodiment, after receiving, using the F_port, the login request message sent by the first server, the switch sends a login response message to the first server using the F_port, where the login response message is used to notify the first server that the switch has successfully received the login request message, and then the switch establishes a correspondence between the first identifier of the first VM and the WWGN according to the login response message. Further, the first VM of the first server sends the login request message to the F_port of the switch using the N_port of the first VM. After receiving the login request message, the F_port of the switch sends the login response message to the N_port of the first VM, and the switch establishes the correspondence between the first identifier of the first VM and the WWGN, and stores the correspondence in a local entry. The switch establishes the correspondence between the first identifier of the first VM and the WWGN, which indicates that the WWGN has been registered successfully using the first identifier of the first VM, then determines, according to the WWGN, the configuration of the first zone to which the WWGN belongs, and then sends, according to the configuration of the first zone, the first identifier of the first VM and the WWGN to the storage device belonging to the first zone. Therefore, the storage device may establish the correspondence between the first identifier of the first VM and the WWGN, and for interaction between the switch and the storage device, reference may be made to a related record in Embodiment 2 or 3 of the method in the present disclosure.

In this embodiment of the present disclosure, when the first VM accesses the FC SAN for the first time using the first server, the network administrator configures, on the switch, the first zone that includes the WWGN and the WWPN of the N_port of the storage device, and the first server performs the method shown in FIG. 1 such that the switch establishes a correspondence between the first identifier of the first VM and the WWGN, and then determines, according to the configuration of the first zone, the storage device with which the first VM may communicate, and therefore the storage device establishes the correspondence between the first identifier of the first VM and the WWGN, and establishes a correspondence between the WWGN and at least one LUN. When the first VM is migrated from the first server to another server, the other server also performs the method shown in FIG. 1 such that the switch establishes a correspondence between the second identifier of the first VM and the WWGN, and for the second identifier of the first VM, reference may be made to description of the first identifier of the first VM. Each N_port used on any server by the first VM belongs to a same port group, and therefore the network administrator does not need to perform partition on the switch again to obtain a zone, and the switch still determines, according to the configuration of the first zone, the storage device with which the first VM may communicate. Therefore, the storage device establishes the correspondence between the second identifier of the first VM and the WWGN, and the storage device does not need to establish a correspondence between a WWGN and an LUN either, but instead may determine, according to the previously established correspondence between the WWGN and at least one LUN, LUNs that can be accessed by the first VM. Therefore, for a same VM, the network administrator only needs to configure a zone once on the switch, and the storage device also only needs to establish a correspondence between a WWGN and an LUN in order to avoid a problem that in each migration process of the VM, the network administrator re-configures a zone and the storage device re-configures a correspondence between the VM and an accessible LUN.

In the method for configuring an FC SAN according to this embodiment of the present disclosure, a first server sends a login request message to a switch, where the login request message includes a first identifier of a first VM and a WWGN of a port group of the first VM, an N_port used on any server by the first VM belongs to the port group of the first VM, and the login request message enables the switch to establish a correspondence between the first identifier of the first VM and the WWGN, and send the first identifier and the WWGN to a storage device according to a configuration of a first zone, and enables the storage device to establish the correspondence between the first identifier and the WWGN. The configuration of the first zone configured in the switch is about the WWGN, and the correspondence configured in the storage device is also about the WWGN. Therefore, in each migration process of the first VM, a network administrator does not need to re-configure a zone, and the storage device does not need to re-configure a correspondence between the first VM and an accessible LUN either such that migration efficiency and flexibility of the VM are improved.

Figure 2:
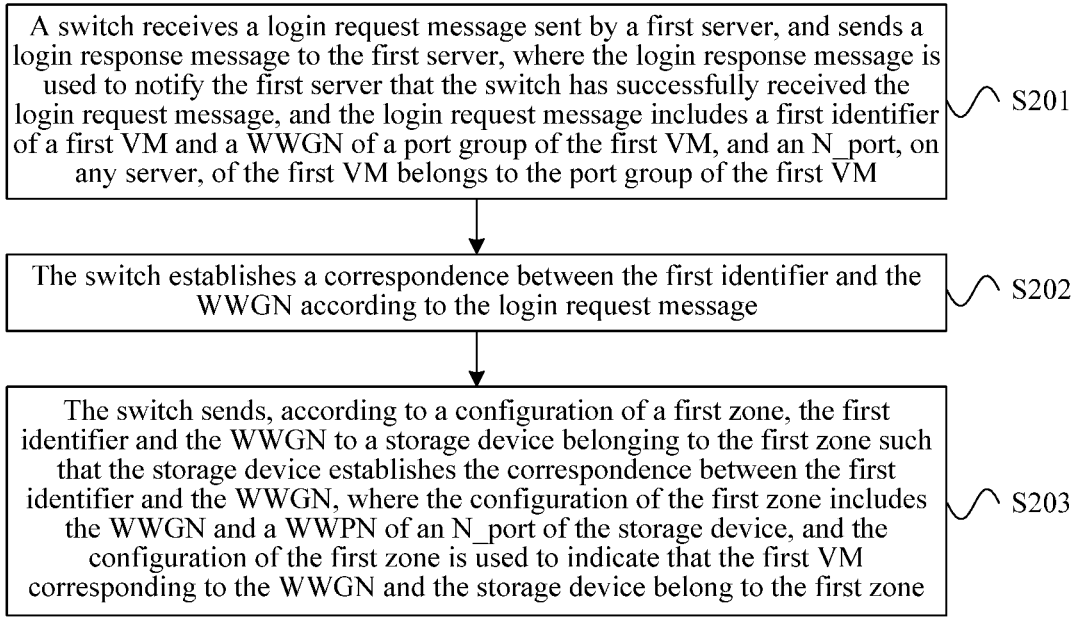
FIG. 2 is a flowchart of Embodiment 2 of a method for configuring an FC SAN according to the present disclosure.

FIG. 2 is a flowchart of Embodiment 2 of a method for configuring an FC SAN according to the present disclosure. As shown in FIG. 2, this embodiment is performed by the switch in the method shown in FIG. 1, that is, a fibre channel switch. As shown in FIG. 2, the method in this embodiment may include the following steps.

Step S201: The switch receives a login request message sent by a first server, and sends a login response message to the first server, where the login response message is used to notify the first server that the switch has successfully received the login request message, and the login request message includes a first identifier of a first VM and a WWGN of a port group of the first VM, and an N_port that is used on any server, of the first VM belongs to the port group of the first VM.

In this embodiment, the first VM is any one of at least one VM on the first server. After the first server completes login of the first VM to the switch, an F_port of the switch receives the login request message that is sent by the first VM using a first N_port of the first VM, and sends the login response message to the first N_port of the first VM, where the login response message is used to notify the first server that the switch has successfully received the login request message, the login request message includes the first identifier of the first VM and the WWGN of the port group of the first VM, the first identifier of the first VM includes at least one of a WWPN of the first N_port of the first VM or an identifier of the first N_port of the first VM, and the first N_port is an N_port used on the first server by the first VM.

Step S202: The switch establishes a correspondence between the first identifier and the WWGN according to the login request message.

In this embodiment, after receiving the login request message, the switch establishes the correspondence between the first identifier and the WWGN according to the login request message, and stores the correspondence in a local entry, which indicates that the WWGN has been registered successfully using the first identifier of the first VM.

Step S203: The switch sends, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone.

Step S203 may further include the following steps.

Step S2031: The switch sends a first state change notification message to the storage device according to the configuration of the first zone, where the first state change notification message is used to notify the storage device that an N_port in the FC SAN is updated.

In this embodiment, the correspondence between the first identifier of the first VM and the WWGN is established in the switch, which indicates that the first VM accesses the FC SAN using the first server, that is, the first N_port of the first VM is added to the FC SAN. A network administrator has set, in the switch, the configuration of the first zone, where the configuration of the first zone includes the WWGN and the WWPN of the N_port of the storage device, and the configuration of the first zone is used to indicate that the first VM corresponding to the WWGN and the storage device belong to the first zone, and the switch further establishes the correspondence between the first identifier of the first VM and the WWGN using step S202, and therefore the switch may determine that a VM corresponding to the first identifier is a VM corresponding to the WWGN, may also determine, according to the WWGN, a configuration of a zone to which the WWGN belongs, that is, the configuration of the first zone, and then may determine, according to the configuration of the first zone, that the first VM corresponding to the first identifier and the storage device belong to the first zone. Therefore, the network administrator only needs to configure, on the switch, the zone including the WWGN of the port group of the first VM once. Then, the switch sends a first state change notification message to the storage device according to the configuration of the first zone, where the first state change notification message is, for example, registered state change notification message (RSCN), and the first state change notification message is used to notify the storage device that an N_port in the FC SAN is updated.

Step S2032: The switch receives a first acquiring request message sent by the storage device, where the first acquiring request message is used to acquire an identifier of a VM belonging to the first zone, and sends a first acquiring response message to the storage device according to the first acquiring request message, the configuration of the first zone, and an identifier(s) corresponding to the WWGN, where the first acquiring response message includes the identifier(s) corresponding to the WWGN, and the identifier(s) corresponding to the WWGN includes the first identifier.

In this embodiment, after receiving the first state change notification message sent by the switch, the storage device sends the first acquiring request message to the switch, where the first acquiring request message is used to acquire an identifier of a VM belonging to the first zone to which the storage device belongs. After receiving the first acquiring request message sent by the storage device, the switch determines, according to the configuration of the first zone, the WWGN belonging to the first zone, then determines the identifier(s) corresponding to the WWGN, and then sends the first acquiring response message to the storage device, where the first acquiring response message includes the identifier(s) corresponding to the WWGN. The identifier(s) corresponding to the WWGN includes at least the first identifier, and in another implementation manner, the identifier(s) corresponding to the WWGN may further include a second identifier except the first identifier. The first acquiring response message is used to enable the storage device to compare the identifier(s) corresponding to the WWGN with a stored identifier of the VM belonging to the first zone in order to determine that the first identifier is an identifier of a VM corresponding to an N_port newly accessing the FC SAN.

If the first VM accesses the FC SAN for the first time using the first server, only the correspondence between the WWGN and the first identifier exists in the switch, but a correspondence between the WWGN and another identifier does not exist in the switch, the switch determines, according to the correspondence between the WWGN and the first identifier, that the identifier(s) corresponding to the WWGN is the first identifier, and then sends the first acquiring response message including the first identifier to the storage device. If the first VM has accessed the FC SAN using a second server, and in a process in which the first VM accesses the FC SAN using the second server, the switch establishes a correspondence between the second identifier of the first VM and the WWGN, where the second identifier includes at least one of a WWPN of a second N_port of the first VM or an identifier of the second N_port of the first VM, and the second N_port is a port used on the second server by the first VM. When the first VM is migrated from the second server to the first server, the correspondence between the WWGN and the first identifier and the correspondence between the WWGN and the second identifier exist in the switch, the switch determines, according to the foregoing correspondences, that the identifier(s) corresponding to the WWGN is the first identifier and the second identifier, and then sends the first acquiring response message including the first identifier and the second identifier to the storage device.

Step S2033: The switch sends the WWGN to the storage device such that the storage device establishes the correspondence between the first identifier and the WWGN.

In this embodiment, after receiving the first acquiring response message, the storage device compares the identifier that corresponds to the WWGN and that is included in the first acquiring response message with a stored identifier of the VM belonging to the first zone, and if a stored identifier of the VM belonging to the first zone does not include the first identifier, the storage device may determine that the first identifier is an identifier of a VM corresponding to an N_port newly accessing the FC SAN. In addition, the switch may further send, to the storage device, the WWGN belonging to a configuration of a same zone (that is, the configuration of the first zone) as that to which the WWPN of the N_port of the storage device belongs, and then the storage device may establish the correspondence between the WWGN and the first identifier. If the first VM accesses the FC SAN for the first time using the first server, the storage device further establishes a correspondence between the WWGN and at least one LUN, that is, configures an accessible LUN for the WWGN. Each N_port used on any server by the first VM belongs to the port group of the first VM, and therefore regardless of which server the first VM is migrated to, after establishing a correspondence between an identifier, in the server, of the first VM and the WWGN, the storage device may determine, according to a configured correspondence between the WWGN and an LUN, which LUNs may be accessed by the first VM, and the storage device does not need to establish a correspondence between the first VM and an accessible LUN in each migration process.

In a first feasible implementation manner, after sending the first acquiring response message to the storage device, the switch sends the WWGN to the storage device using a newly added message, where the newly added message indicates that an N_port updated in the FC SAN belongs to the port group corresponding to the WWGN. After receiving the newly added message, the storage device learns, according to the newly added message, that the N_port newly accessing the FC SAN belongs to the port group corresponding to the WWGN in the newly added message in order to establish the correspondence between the first identifier and the WWGN.

In a second feasible implementation manner, before sending, by the switch, the WWGN to the storage device, the method further includes receiving, by the switch, a second acquiring request message sent by the storage device, where the second acquiring request message includes the first identifier, and the second acquiring request message is used to acquire the WWGN corresponding to the first identifier, and sending, by the switch, the WWGN to the storage device includes sending, by the switch, a second acquiring response message including the WWGN to the storage device according to the correspondence between the first identifier and the WWGN.

In this embodiment, after determining that the first identifier is an identifier of a VM corresponding to the N_port newly accessing the FC SAN, the storage device sends the second acquiring request message including the first identifier to the switch, where the second acquiring request message is used to acquire the WWGN corresponding to the first identifier, that is, is used to acquire the WWGN of the port group to which the N_port newly accessing the FC SAN belongs, and then the switch determines, according to the second acquiring request message and the correspondence between the WWGN and the first identifier, the WWGN corresponding to the first identifier, and adds the WWGN to the second acquiring response message and sends the second acquiring response message to the storage device.

Optionally, the first acquiring response message further includes a control field of each identifier of the identifier(s) corresponding to the WWGN, each control field includes a port group attribute support bit, and the port group attribute support bit is used to indicate whether an N_port corresponding to each identifier supports a port group attribute such that when the first N_port of the first VM corresponding to the first identifier supports the port group attribute, the storage device sends the second acquiring request message to the switch. The first acquiring response message includes a control field of the first identifier and a control field of the second identifier when the identifier(s) corresponding to the WWGN includes the first identifier and the second identifier.

In the method for configuring an FC SAN according to Embodiment 2 of the present disclosure, a switch establishes a correspondence between a first identifier and a WWGN according to a login request message that is sent by a first server and that includes the first identifier of a first VM and the WWGN of a port group of the first VM, where an N_port used on any server by the first VM belongs to the port group of the first VM, and sends the first identifier and the WWGN to a storage device according to a configuration of a first zone including the WWGN such that the storage device establishes the correspondence between the first identifier and the WWGN. The configuration of the first zone configured in the switch is based on the WWGN, and the correspondence configured in the storage device is also based on the WWGN. Therefore, in each migration process of the first VM, a network administrator does not need to re-configure a zone, and the storage device does not need to re-configure a correspondence between the first VM and an accessible LUN either such that migration efficiency and flexibility of the VM are improved.

Figure 3:
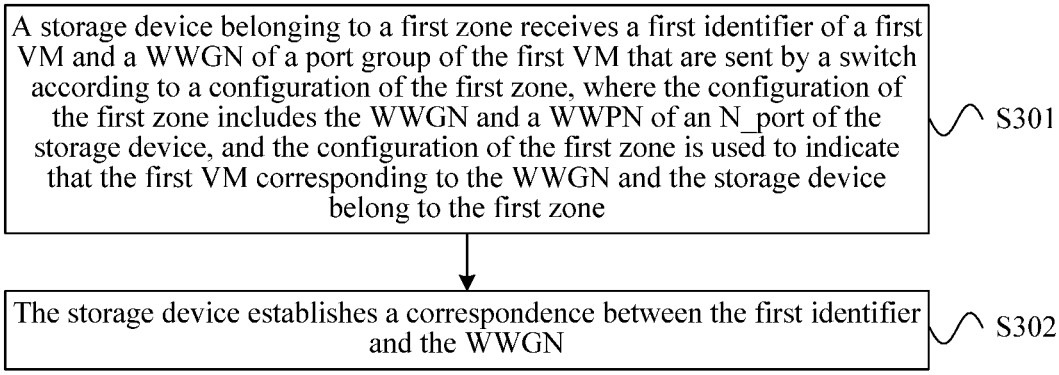
FIG. 3 is a flowchart of Embodiment 3 of a method for configuring an FC SAN according to the present disclosure.

FIG. 3 is a flowchart of Embodiment 3 of a method for configuring an FC SAN according to the present disclosure. As shown in FIG. 3, this embodiment is performed by the storage device in the method shown in FIG. 1 and FIG. 2. As shown in FIG. 3, the method in this embodiment may include the following steps.

Step S301: The storage device belonging to a first zone receives a first identifier of a first VM and a WWGN of a port group of the first VM that are sent by a switch according to a configuration of the first zone, where the configuration of the first zone includes the WWGN and a WWPN of an N_port of the storage device, and the configuration of the first zone is used to indicate that the first VM corresponding to the WWGN and the storage device belong to the first zone.

Receiving, by the storage device, a first identifier of a first VM and a WWGN of a port group of the first VM that are sent by a switch according to a configuration of the first zone includes the following steps.

Step S3011: The storage device receives a first state change notification message that is sent by the switch according to the configuration of the first zone, where the first state change notification message is used to notify the storage device that an N_port in the FC SAN is updated.

In this embodiment, for how to trigger the switch to send the first state change notification message to the storage device, reference may be made to a related record in steps S201 to S203 in Embodiment 2 of the method in the present disclosure.

Step S3012: The storage device sends a first acquiring request message to the switch according to the first state change notification message, where the first acquiring request message is used to acquire an identifier of a VM belonging to the first zone, and receives a first acquiring response message that is sent by the switch according to the first acquiring request message, the configuration of the first zone, and an identifier(s) corresponding to the WWGN, where the first acquiring response message includes the identifier(s) corresponding to the WWGN, and the identifier(s) corresponding to the WWGN includes the first identifier.

Step S3013: The storage device compares the identifier(s) corresponding to the WWGN with a stored identifier of the VM belonging to the first zone in order to determine that the first identifier is an identifier of a VM corresponding to an N_port newly accessing the FC SAN.

In this embodiment, after receiving the first state change notification message sent by the switch, the storage device sends a first acquiring request message to the switch, where the first acquiring request message is used to acquire the identifier of the VM belonging to the first zone. The switch searches for a corresponding zone according to a WWPN of an N_port of the storage device in the first acquiring request message, to find the first zone, determines the WWGN according to the configuration of the first zone, then acquires the identifier(s) corresponding to the WWGN according to the WWGN, and adds the identifier(s) corresponding to the WWGN to the first acquiring response message, and sends the first acquiring response message to the storage device, where the identifier(s) corresponding to the WWGN includes the first identifier, and the first identifier includes at least one of a WWPN of a first N_port of the first VM or an identifier of the first N_port of the first VM. Therefore, the storage device may compare the identifier(s) corresponding to the WWGN with a stored identifier of the VM belonging to the first zone in order to determine that the first identifier is an identifier of a VM corresponding to an N_port newly accessing the FC SAN.

If the first VM accesses the FC SAN for the first time using the first server, only the correspondence between the WWGN and the first identifier exists in the switch, but a correspondence between the WWGN and another identifier does not exist in the switch, the switch determines the first identifier according to the correspondence between the WWGN and the first identifier, and then sends the first acquiring response message including the first identifier to the storage device. The first acquiring response message received by the storage device includes the first identifier, and the identifier, of the VM that belongs to the first zone, stored in the storage device in this case is null. The storage device compares the first identifier and a stored identifier of the VM belonging to the first zone, may determine that the first identifier included in the first acquiring response message is a newly added identifier in order to determine that the first identifier is an identifier of a VM corresponding to an N_port newly accessing the FC SAN. Then, the storage device updates, according to the first identifier, the stored identifier of the VM belonging to the first zone, that is, the storage device adds the first identifier to the identifier of the VM belonging to the first zone.

If the first VM has accessed the FC SAN using a second server, and in a process in which the first VM accesses the FC SAN using the second server, the switch establishes a correspondence between the second identifier of the first VM and the WWGN, the second identifier includes at least one of a WWPN of a second N_port of the first VM or an identifier of the second N_port of the first VM, and the second N_port is an N_port used on the second server by the first VM. When the first VM is migrated from the second server to the first server, the correspondence between the WWGN and the first identifier and the correspondence between the WWGN and the second identifier exist in the switch, the switch determines, according to the foregoing correspondences, that the identifier(s) corresponding to the WWGN is the first identifier and the second identifier, and then sends the first acquiring response message including the first identifier and the second identifier to the storage device. In this case, the second identifier of the first VM belonging to the first zone is already stored in the storage device, and the storage device may compare a stored identifier of the VM belonging to the first zone with the first identifier and the second identifier that are included in the first acquiring response message, and may determine that the first identifier is a newly added identifier. Therefore, the storage device may determine that the first identifier is an identifier of a VM corresponding to an N_port newly accessing the FC SAN. Then, the storage device updates, according to the first identifier, the stored identifier of the VM belonging to the first zone, that is, adds the first identifier to the stored identifier of the VM belonging to the first zone.

Step S3014: The storage device receives the WWGN sent by the switch.

Step S302: The storage device establishes a correspondence between the first identifier and the WWGN.

In this embodiment, the switch may further send, to the storage device, the WWGN belonging to a configuration of a same zone (that is, the configuration of the first zone) as that to which the WWPN of the N_port of the storage device belongs, and then the storage device may establish the correspondence between the WWGN and the determined first identifier.

In this embodiment, for how the switch sends the WWGN to the storage device, reference may be made to a related record in Embodiment 2 of the method in the present disclosure.

In this embodiment, after determining that the first identifier is an identifier of a VM corresponding to the N_port newly accessing the FC SAN, the storage device sends a second acquiring request message including the first identifier to the switch, where the second acquiring request message is used to acquire the WWGN corresponding to the first identifier, that is, is used to acquire the WWGN of the port group to which the N_port newly accessing the FC SAN belongs, and then the switch determines, according to the second acquiring request message and the correspondence between the WWGN and the first identifier, the WWGN corresponding to the first identifier, and adds the WWGN to the second acquiring response message and sends the second acquiring response message to the storage device. After receiving the second acquiring response message, the storage device establishes the correspondence between the WWGN and the first identifier.

Optionally, the first acquiring response message further includes a control field of each identifier(s) corresponding to the WWGN, each control field includes a port group attribute support bit, and the port group attribute support bit is used to indicate whether an N_port corresponding to each identifier supports a port group attribute, and sending, by the storage device, a second acquiring request message to the switch includes sending, by the storage device, the second acquiring request message to the switch when the first N_port of the first VM corresponding to the first identifier supports the port group attribute. Further, when there are multiple identifiers that correspond to the WWGN, the first acquiring response message includes control fields of the identifiers, that is, each identifier corresponds to one control field. For example, the first acquiring response message further includes a control field of the first identifier when the identifiers corresponding to the WWGN include the first identifier, where the control field includes a port group attribute support bit, and the port group attribute support bit is used to indicate whether the first N_port of the first VM supports a port group attribute. The first N_port of the first VM belongs to the port group of the first VM, that is, the N_port supports the port group attribute, and therefore the port group attribute support bit of the control field of the first identifier indicates that the first N_port of the first VM supports the port group attribute. In an embodiment, when the port group attribute support bit is 1, it indicates that the port group attribute is supported, and the port group attribute is not supported when the port group attribute support bit is 0. The storage device determines, according to the port group attribute support bit, whether the first N_port of the first VM supports the port group attribute. The storage device sends the second acquiring request message to the switch in order to acquire the WWGN if the first N_port of the first VM supports the port group attribute, and then establishes the correspondence between the first identifier and the WWGN. If the first N_port of the first VM does not support the port group attribute, the storage device performs processing according to a process in other approaches.

Optionally, if the first VM accesses the FC SAN for the first time using the first server, after establishing, by the storage device, a correspondence between the first identifier and the WWGN, the method further includes establishing, by the storage device, a correspondence between the WWGN and at least one LUN, that is, configuring, by the storage device, an LUN associated with the WWGN, and establishing a correspondence between the WWGN and the LUN, and therefore the storage device may determine, according to the correspondence between the first identifier and the WWGN and the correspondence between the WWGN and at least one LUN, that the first VM may access the at least one LUN using the first N_port, where the at least one LUN is used to indicate a logical unit that is accessible to the first VM corresponding to the WWGN. Each N_port used on any server by the first VM belongs to the port group of the first VM, and therefore regardless of which server the first VM is migrated to, as long as the storage device establishes a correspondence between an identifier of an N_port used on the server by the first VM and the WWGN, the storage device may determine, according to a configured correspondence between the WWGN and an LUN, which LUNs may be accessed by the first VM, and the storage device does not need to establish a correspondence between the first VM and an accessible LUN after each migration of the first VM.

If the first VM is migrated from the second server to the first server, because in a process in which the first VM accesses the FC SAN for the first time, the storage device has established the correspondence between the WWGN and at least one LUN, the storage device may determine, according to the established correspondence between the WWGN and the first identifier and the previously established correspondence between the WWGN and at least one LUN, which LUNs may be accessed by the first VM. Therefore, the storage device does not need to re-configure the correspondence between the first VM and an accessible LUN either.

In the method for configuring an FC SAN according to Embodiment 3 of the present disclosure, a storage device receives a first state change notification message that is sent by a switch according to a configuration of a first zone after the switch establishes a correspondence between a first identifier of a first VM and a WWGN of a port group of the first VM, where an N_port used on any server by the first VM belongs to the port group of the first VM, and the storage device acquires the first identifier and the WWGN from the switch, and then establishes the correspondence between the first identifier and the WWGN. The configuration of the first zone configured in the switch is based on the WWGN, and the correspondence configured in the storage device is also based on the WWGN. Therefore, in each migration process of the first VM, a network administrator does not need to re-configure a zone, and the storage device does not need to re-configure a correspondence between the first VM and an accessible LUN either such that migration efficiency and flexibility of the VM are improved.

Figure 4:
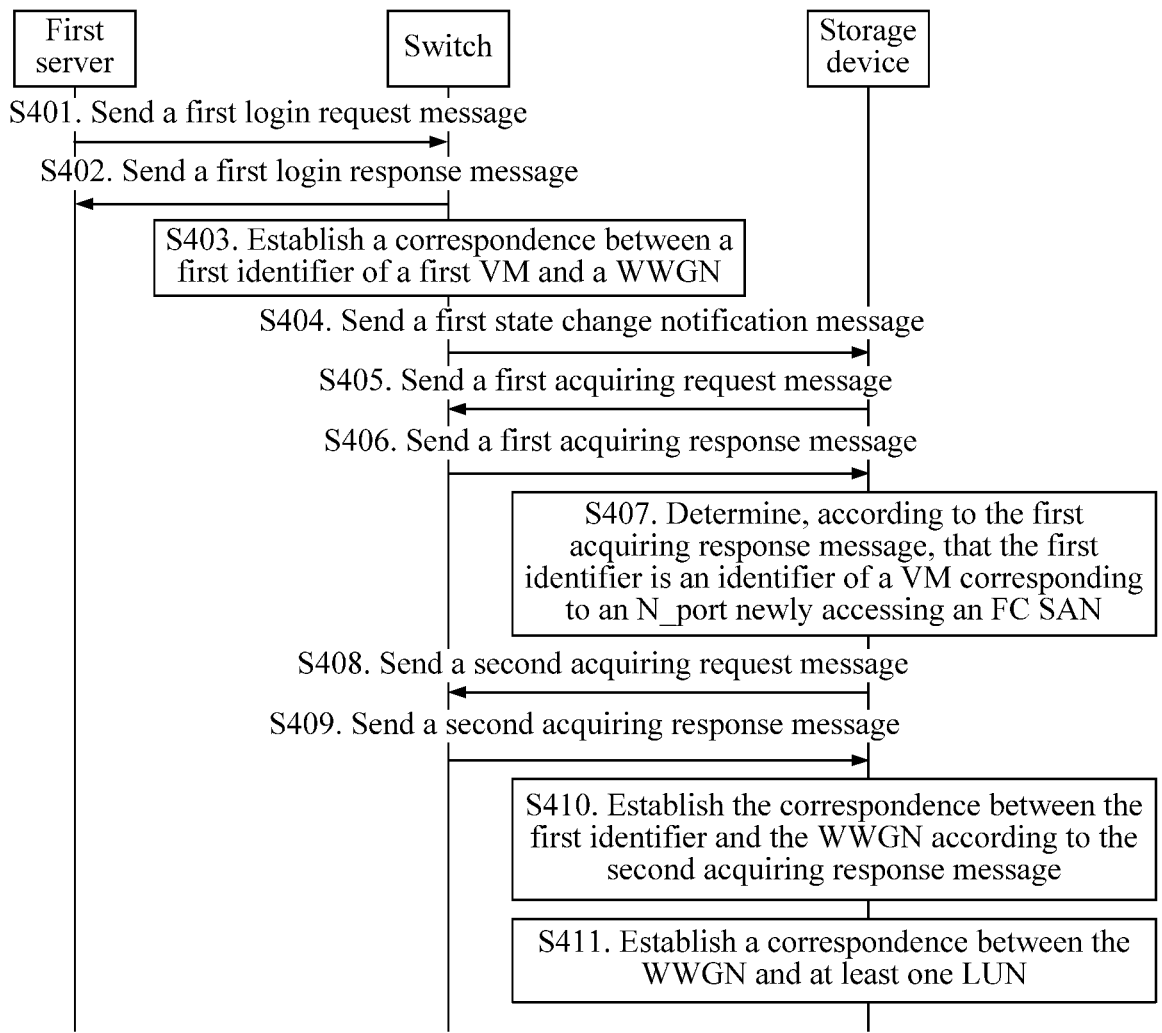
FIG. 4 is a flowchart of Embodiment 4 of a method for configuring an FC SAN according to the present disclosure.

FIG. 4 is a flowchart of Embodiment 4 of a method for configuring an FC SAN according to the present disclosure. This embodiment is applied to a scenario in which a first VM accesses the FC SAN for the first time using a first server. As shown in FIG. 4, the method in this embodiment may include the following steps.

Step S401: The first server sends a first login request message to a switch.

In this embodiment, a first VM is any one of at least one VM that is set on the first server, and the first server completes login of the first VM to the switch. For a specific implementation process, reference may be made to a related record in Embodiment 1 of the method in the present disclosure. Then, the first server further sends the first login request message to the switch, where the first login request message includes a first identifier of the first VM and a WWGN of a port group of the first VM, and the first identifier includes at least one of a WWPN of a first N_port of the first VM or an identifier of the first N_port of the first VM, and the first N_port is an N_port that is used on the first server by the first VM, where an N_port that is used on any server by the first VM belongs to the port group of the first VM.

Step S402: The switch sends a first login response message to the first server.

The switch sends the first login response message to the first server after receiving the first login request message sent by the first server, where the login response message is used to notify the first server that the switch has successfully received the first login request message.

Step S403: The switch establishes a correspondence between a first identifier of a first VM and a WWGN.

The switch establishes the correspondence between the first identifier of the first VM and the WWGN according to the first login request message.

In a first feasible implementation manner, the first identifier of the first VM may be the WWPN of the first N_port of the first VM, and then the switch may establish a correspondence between the WWPN of the first N_port of the first VM and the WWGN. Therefore, the switch may obtain a correspondence among the identifier of the first N_port of the first VM, the WWPN of the first N_port of the first VM and the WWGN. The first login request message may be a register group name-port name request (RGN_PN), and the first login response message is an accept response to the RGN_PN.

In a second feasible implementation manner, the first identifier of the first VM is the identifier of the first N_port of the first VM, and then the switch may establish a correspondence between the identifier of the first N_port of the first VM and the WWGN. Therefore, the switch may obtain a correspondence among the WWPN of the first N_port of the first VM, the identifier of the first N_port of the first VM and the WWGN. The first login request message may be a register group name-port identifier request (RGN_ID). The first login response message is an accept response to the RGN_ID.

In a third feasible implementation manner, the first identifier of the first VM is the WWPN of the first N_port of the first VM and the identifier of the first N_port of the first VM, and the first login request message may be a register group name-port name and port identifier request (RGN_PN and ID). The first login response message is an accept response to the RGN_PN and ID.

Step S404: The switch sends a first state change notification message to a storage device belonging to a first zone.

In this embodiment, after establishing the correspondence between the first identifier and the WWGN, the switch may determine that an N_port accesses the FC SAN. A network administrator has configured the first zone on the switch, where a configuration of the first zone includes the WWGN and a WWPN of an N_port of the storage device, and the configuration of the first zone is used to indicate that a VM corresponding to the WWGN (that is, the first VM) and the storage device belong to the first zone. The switch may send the first state change notification message to the storage device according to the configuration of the first zone, where the first state change notification message is used to notify the storage device that an N_port in the FC SAN is updated. Correspondingly, the storage device in this embodiment receives the first state change notification message, and the first state change notification message may be an RSCN.

Step S405: The storage device sends a first acquiring request message to the switch.

In this embodiment, the storage device may send the first acquiring request message to the switch according to the first state change notification message, where the first acquiring request message is used to acquire an identifier of a VM belonging to the first zone.

Step S406: The switch sends a first acquiring response message to the storage device.

The switch may determine the WWGN according to the WWPN of the N_port of the storage device and the configuration of the first zone after receiving the first acquiring request message sent by the storage device. The first VM accesses the FC SAN for the first time, and therefore, only the correspondence between the WWGN and the first identifier of the first VM is established in the switch. Therefore, the switch determines, according to the correspondence, the first identifier of the first VM corresponding to the WWGN, and sends the first acquiring response message including the first identifier of the first VM to the storage device, and correspondingly, the storage device receives the first acquiring response message. The first acquiring response message in this embodiment may further include a control field of the first identifier, where the control field includes a port group attribute support bit, and the port group attribute support bit is used to indicate whether the first N_port of the first VM corresponding to the first identifier supports a port group attribute.

In a first feasible implementation manner, the first identifier is the WWPN of the first N_port of the first VM, and the first acquiring request message may be a request for querying the switch for names of all registered N_ports of a VM belonging to the first zone to which the storage device belongs (GPN_FT). The first acquiring response message may be an accept response packet of the GPN_FT. In the accept response packet of the GPN_FT, a control field of each returned port name has 8 bits totally, and it may be defined that the sixth bit is the port group attribute support bit, whose identifier is s. It indicates that an N_port corresponding to the port name supports a group attribute when s is 1, and it indicates that the N_port corresponding to the port name does not support the group attribute when s is 0.

In a second feasible implementation manner, the first identifier is the identifier of the first N_port of the first VM, and the first acquiring request message may be a request for querying the switch for identifiers of all registered N_ports of a VM belonging to the first zone to which the storage device belongs (GID_FT). Then, the switch determines, according to the configuration of the first zone and the correspondence between the identifier of the first N_port of the first VM and the WWGN, that the identifier of the first N_port of the first VM is an identifier belonging to all registered N_ports of the VM of the first zone, and then sends the first acquiring response message including the identifier of the first N_port of the first VM to the storage device, where the first acquiring response message may be an accept response packet of the GID_FT. In the accept response packet of the GID_FT, a control field of each returned port identifier has 8 bits totally, and it may be defined that the sixth bit is the port group attribute support bit, whose identifier is s. It indicates that an N_port corresponding to the port identifier supports a group attribute when s is 1, and it indicates that the N_port corresponding to the port name does not support the group attribute when s is 0.

In a third feasible implementation manner, the first identifier is the WWPN of the first N_port of the first VM and the identifier of the first N_port of the first VM, and the first acquiring request message may be a GPN_FT and a GID_FT. Correspondingly, the first acquiring response message may be an accept response packet of the GPN_FT and an accept response packet of the GID_FT.

Step S407: The storage device determines, according to the first acquiring response message, that the first identifier is an identifier of a VM corresponding to an N_port newly accessing the FC SAN.

In this embodiment, after receiving the first acquiring response message sent by the switch, the storage device compares the first identifier in the first acquiring response message with an identifier, stored in the storage device, of a VM corresponding to a registered N_port and that belongs to the first zone, finds that the identifier, stored in the storage device, of the VM corresponding to the registered N_port and that belongs to the first zone is not stored in the storage device in order to determine that the first identifier is a newly added identifier, and therefore may determine that the first identifier is the identifier of the VM corresponding to the N_port newly accessing the FC SAN.

Step S408: The storage device sends a second acquiring request message to the switch.

After determining that the first identifier is the identifier of the VM corresponding to the N_port newly accessing the FC SAN, the storage device determines, according to the port group attribute support bit in the control field of the first identifier, that the first N_port of the first VM supports the port group attribute, and the storage device sends the second acquiring request message including the first identifier to the switch, where the second acquiring request message is used to acquire the WWGN corresponding to the first identifier.

Step S409: The switch sends a second acquiring response message to the storage device.

After receiving the second acquiring request message sent by the storage device, the switch sends, according to the first identifier in the second acquiring request message and the correspondence between the first identifier and the WWGN, the second acquiring response message including the WWGN to the storage device.

In a first feasible implementation manner, the first identifier may be the WWPN of the first N_port of the first VM, the second acquiring request message may be a get group name-port name request (GGN_PN), and correspondingly, the second acquiring response message is an accept response packet of the GGN_PN.

In a second feasible implementation manner, the first identifier may be the identifier of the first N_port of the first VM, the second acquiring request message may be a get group name-port identifier request (GGN_ID), and correspondingly, the second acquiring response message is an accept response packet of the GGN_ID.

In a third feasible implementation manner, the first identifier may be the WWPN of the first N_port of the first VM and the identifier of the first N_port of the first VM, the second acquiring request message may be a get group name-port name and port identifier request (GGN_PN and ID), and correspondingly, the second acquiring response message is an accept response packet of the GGN_PN and ID.

Step S410: The storage device establishes the correspondence between the first identifier and the WWGN according to the second acquiring response message.

In this embodiment, the storage device may determine, according to the second acquiring response message, that the first N_port of the first VM corresponding to the first identifier belongs to the port group corresponding to the WWGN in order to establish the correspondence between the first identifier and the WWGN.

Step S411: The storage device establishes a correspondence between the WWGN and at least one LUN.

In this embodiment, the storage device has not yet established a correspondence related to the WWGN and an LUN, and therefore the storage device further needs to establish the correspondence between the WWGN and at least one LUN. The correspondence is used to indicate an LUN accessible to a VM corresponding to the WWGN (that is, the first VM).

In the method for configuring an FC SAN according to this embodiment, a first server sends a first identifier of a first VM and a WWGN to a switch, and the switch establishes a correspondence between the first identifier and the WWGN, and sends, according to a configuration of a first zone, an identifier of a VM belonging to the first zone to a storage device belonging to the first zone. The storage device may determine, from the identifier, that the first identifier is an identifier of a VM corresponding to an N_port newly accessing the FC SAN, acquire the WWGN from the switch according to the first identifier, establish the correspondence between the first identifier and the WWGN, and further establish a correspondence between the WWGN and at least one LUN, where an N_port used on any server by the first VM belongs to a port group of the first VM. Therefore, in each migration process of the first VM, a network administrator does not need to re-configure a zone, and the storage device does not need to re-configure a correspondence between the first VM and an accessible LUN either such that migration efficiency and flexibility of the VM are improved.

Figure 5:
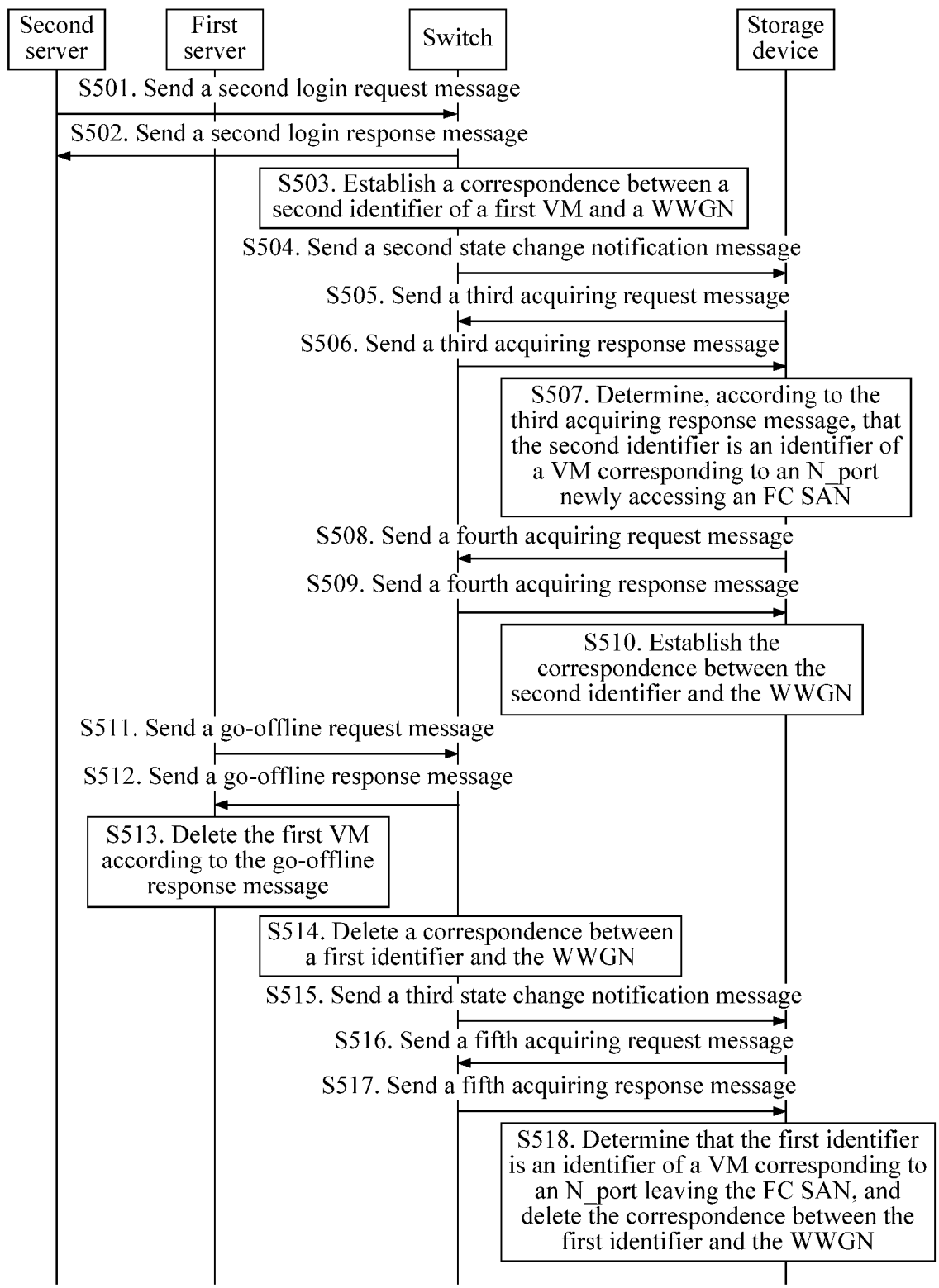
FIG. 5 is a flowchart of Embodiment 5 of a method for configuring an FC SAN according to the present disclosure.

FIG. 5 is a flowchart of Embodiment 5 of a method for configuring an FC SAN according to the present disclosure. This embodiment is applied to an application in which a first VM is migrated from a first server to a second server, that is, an N_port is also allocated to the first VM on the second server, and the first VM accesses the FC SAN using the second server. In a migration process, the first VM accesses the FC SAN using both the first server and the second server. As shown in FIG. 5, after the method shown in FIG. 4 is performed, the method in this embodiment may include the following steps.

Step S501: The second server sends a second login request message to the switch.

In this embodiment, an N_port is also allocated to the first VM on the second server if the first VM needs to be migrated from the first server to the second server. Each N_port used on any server by the first VM belongs to a port group of the first VM, and therefore a VM manager of the second server allocates, to the first VM migrated to the second server, a WWGN the same as a WWGN allocated by the first server.

Step S502: The switch sends a second login response message to the second server.

Step S503: Establish a correspondence between a second identifier of the first VM and the WWGN.

In this embodiment, a specific implementation process of steps S501 to S503 is similar to a specific implementation process of steps S401 to S403 in Embodiment 4 of the method in the present disclosure, and the second login request message sent by the second server includes the second identifier of the first VM and the WWGN of the port group of the first VM. The second identifier includes at least one of a WWPN of an N_port used on the second server by the first VM or an identifier of the N_port used on the second server by the first VM.

Step S504: The switch sends a second state change notification message to the storage device belonging to the first zone.

In this embodiment, after establishing the correspondence between the second identifier and the WWGN, the switch may determine that a new N_port accesses the FC SAN. A network administrator configures the first zone on the switch before the first VM accesses the FC SAN for the first time, and therefore, the switch may determine, according to the correspondence between the second identifier of the first VM and the WWGN, a configuration of the first zone including the WWGN, then determine, according to the configuration of the first zone, the storage device that belongs to the first zone to which the first VM belongs, and send the second state change notification message to the storage device, where the second state change notification message may be, for example, an RSCN, and the second state change notification message is used to notify the FC SAN that an N_port is updated. Therefore, in a migration process of the first VM, the network administrator does not need to re-configure a configuration of a zone on the switch again.

Step S505: The storage device sends a third acquiring request message to the switch.

In this embodiment, the third acquiring request message is used to acquire an identifier of a VM belonging to the first zone to which the storage device belongs.

Step S506: The switch sends a third acquiring response message to the storage device.

The switch may determine the WWGN according to the configuration of the first zone. The first VM is migrated from the first server to the second server, and therefore the switch establishes the correspondence between the WWGN and the first identifier of the first VM using step S403 in Embodiment 4 of the method in the present disclosure, and establishes the correspondence between the WWGN and the second identifier using step S503 in Embodiment 5 of the method in the present disclosure. The switch determines, according to the foregoing correspondences, that the identifier(s) corresponding to the WWGN includes the first identifier and the second identifier, and sends the third acquiring response message including the first identifier and the second identifier to the storage device.

Step S507: The storage device determines, according to the third acquiring response message, that the second identifier is an identifier of a VM corresponding to an N_port newly accessing the FC SAN.

In this embodiment, after receiving the third acquiring response message sent by the switch, the storage device compares the first identifier and the second identifier that are in the third acquiring response message with an identifier, stored in the storage device, of a VM corresponding to a registered N_port and that belongs to the first zone (the identifier includes the first identifier in this case), finds that only the first identifier, stored in the storage device, of the VM corresponding to the registered N_port and that belongs to the first zone is stored in the storage device in order to determine that the second identifier is a newly added identifier, and therefore determines that the second identifier is the identifier of the VM corresponding to the N_port newly accessing the FC SAN. The storage device may further add the second identifier to the stored identifier of the VM that corresponds to the registered N_port and that belongs to the first zone to which the storage device belongs.

The third acquiring response message in this embodiment further includes a control field of the first identifier and a control field of the second identifier, each control field includes a port group attribute support bit, a port group attribute support bit in the control field of the first identifier is used to indicate whether a first N_port, of the first VM, corresponding to the first identifier supports a port group attribute, and a port group attribute support bit in the control field of the second identifier is used to indicate whether a second N_port, of the first VM, corresponding to the second identifier supports a port group attribute.

Step S508: The storage device sends a fourth acquiring request message to the switch.

The storage device determines, according to the port group attribute support bit in the control field of the second identifier, that the second N_port of the first VM supports the port group attribute, and the storage device then sends the fourth acquiring request message including the second identifier to the switch, where the fourth acquiring request message is used to acquire a WWGN corresponding to the second identifier.

Step S509: The switch sends a fourth acquiring response message to the storage device.

After receiving the fourth acquiring request message sent by the storage device, the switch sends, according to the second identifier in the fourth acquiring request message and the correspondence between the second identifier and the WWGN, the fourth acquiring response message including the WWGN to the storage device.

Step S510: The storage device establishes the correspondence between the second identifier and the WWGN.

In this embodiment, the storage device may determine, according to the fourth acquiring response message, that the N_port of the VM corresponding to the second identifier belongs to the port group corresponding to the WWGN in order to establish the correspondence between the second identifier and the WWGN. The storage device establishes a correspondence between the WWGN and at least one LUN when the first VM accesses the FC SAN for the first time, and therefore in this case, the storage device does not need to establish a correspondence between the WWGN and an LUN again, and the storage device may determine, according to the correspondence between the second identifier and the WWGN and the correspondence between the WWGN and at least one LUN, which LUNs may be accessed by an N_port used on the second server by the first VM.

In the method for configuring an FC SAN according to this embodiment, in a process in which the first VM is migrated from the first server to the second server, the switch establishes the correspondence between the second identifier and the WWGN, and sends, according to the configuration of the first zone including the WWGN, the identifier(s) corresponding to the WWGN to the storage device, and the storage device may determine that the second identifier is an identifier of a VM corresponding to an N_port newly accessing the FC SAN, acquire the WWGN from the switch according to the second identifier, establish the correspondence between the second identifier and the WWGN, and then may determine, according to the established correspondence between the WWGN and at least one LUN, which LUNs may be accessed by an N_port used on the second server by the first VM. Therefore, in each migration process of the first VM, a network administrator does not need to re-configure a zone, and the storage device does not need to re-configure a correspondence between the first VM and an accessible LUN either such that migration efficiency and flexibility of the VM are improved.

Step S511: The first server sends a go-offline request message to the switch.

In this embodiment, after the first server learns that the first VM successfully accesses the FC SAN using the second server, the first server sends the go-offline request message to the switch, where the go-offline request message includes the first identifier of the first VM.

Step S512: The switch sends a go-offline response message to the first server.

The switch receives the go-offline request message sent by the first server, and sends the go-offline response message to the first server in order to notify the first server that the switch has successfully received the go-offline request message.

Step S513: The first server deletes the first VM according to the go-offline response message.

In this embodiment, the first server deletes the first VM that is set on the first server in order to release a resource occupied by the first VM after receiving the go-offline response message.

Step S514: The switch deletes the correspondence between the first identifier and the WWGN.

In this embodiment, the switch deletes, according to the go-offline request message, the correspondence, between the first identifier and the WWGN, established using step S403 shown in FIG. 4.

Step S515: The switch sends a third state change notification message to the storage device.

In this embodiment, after deleting the correspondence between the first identifier and the WWGN, the switch may determine that an N_port in the FC SAN goes offline, and the switch determines, according to the configuration of the first zone, the storage device belonging to the first zone to which the first VM belongs, and sends the third state change notification message to the storage device, where the third state change notification message is used to notify the storage device that an N_port in the FC SAN is updated.

Step S516: The storage device sends a fifth acquiring request message to the switch.

The fifth acquiring request message is used to acquire an identifier of a VM belonging to the first zone to which the storage device belongs.

Step S517: The switch sends a fifth acquiring response message to the storage device.

The switch may determine the WWGN according to the configuration of the first zone. The switch has deleted the correspondence between the first identifier and the WWGN, and therefore the switch determines, according to the correspondence between the WWGN and the second identifier of the first VM, that the identifier(s) corresponding to the WWGN is the second identifier, and sends the fifth acquiring response message including the second identifier to the storage device. The fifth acquiring response message in this embodiment may further include a control field of the second identifier, where the control field includes a port group attribute support bit, and the port group attribute support bit is used to indicate whether the second N_port of the first VM corresponding to the second identifier supports a port group attribute.

Step S518: The storage device determines that the first identifier is an identifier of a VM corresponding to an N_port leaving the FC SAN, and deletes the correspondence between the first identifier and the WWGN.

In this embodiment, the storage device receives the fifth acquiring response message sent by the switch, compares the second identifier included in the fifth acquiring response message with identifiers (the first identifier and the second identifier), stored in the storage device, of a VM that corresponds to a registered N_port and that belongs to the first zone to which the storage device belongs in order to determine that the first identifier is the identifier of the VM corresponding to the N_port leaving the FC SAN. Then, the storage device deletes the correspondence, between the second identifier and the WWGN, established using step S410 shown in FIG. 4.

In the method for configuring an FC SAN according to this embodiment of the present disclosure, after a first VM is migrated from a first server to a second server, the first server sends a go-offline request message including a first identifier to the switch, and then the switch deletes a correspondence between the first identifier and the WWGN, and sends, according to a configuration of a first zone including the WWGN, an identifier(s) corresponding to the WWGN to a storage device belonging to the first zone. The storage device may determine that the first identifier is an identifier of a VM corresponding to an N_port leaving the FC SAN, and deletes the correspondence between the first identifier and the WWGN in order to avoid in the other approaches that after each migration of a VM, a configuration of a zone on a switch and a correspondence between a first VM on a storage device and an accessible LUN need to be deleted such that migration efficiency and flexibility of the VM are improved.

Figure 6:
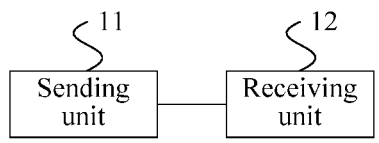
FIG. 6 is a schematic structural diagram of Embodiment 1 of a server according to the present disclosure.

FIG. 6 is a schematic structural diagram of Embodiment 1 of a server according to the present disclosure. As shown in FIG. 6, the server in this embodiment is used as a first server and may include a sending unit 11 and a receiving unit 12, where the sending unit 11 is configured to send a login request message to a switch, where the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server by the first VM belongs to the port group of the first VM, and the login request message is used to enable the switch to establish a correspondence between the first identifier and the WWGN, and send, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone, and the receiving unit 12 is configured to receive a login response message sent by the switch, where the login response message is used to notify the first server that the switch has successfully received the login request message.

The server in this embodiment may be configured to perform a technical solution of the embodiment of the method shown in FIG. 1, implementation principles and technical effects thereof are similar, and details are not described herein again.

Figure 7:
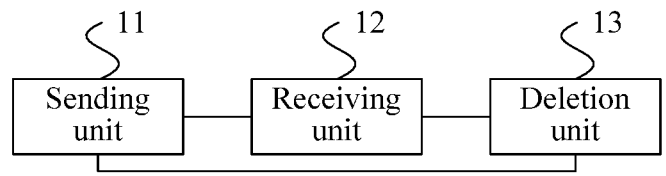
FIG. 7 is a schematic structural diagram of Embodiment 2 of a server according to the present disclosure.

FIG. 7 is a schematic structural diagram of Embodiment 2 of a server according to the present disclosure. As shown in FIG. 7, on the basis of a structure of the server shown in FIG. 6, the server in this embodiment may further include a deletion unit 13, where the sending unit 11 is further configured to send a go-offline request message to the switch after the first VM is migrated from the first server to a second server, where the go-offline request message includes the first identifier, and the go-offline request message is used to enable the switch to delete the correspondence between the first identifier and the WWGN, and send the first identifier and the WWGN to the storage device such that the storage device deletes the correspondence between the first identifier and the WWGN. The receiving unit 12 is further configured to receive a go-offline response message sent by the switch, where the go-offline response message is used to notify the first server that the switch has successfully received the go-offline request message, and the deletion unit 13 is configured to delete the first VM according to the go-offline response message received by the receiving unit 12.

The server in this embodiment may be configured to perform a technical solution performed by the first server in the embodiment of the shown method described above in the present disclosure, and implementation principles and technical effects thereof are similar.

Figure 8:
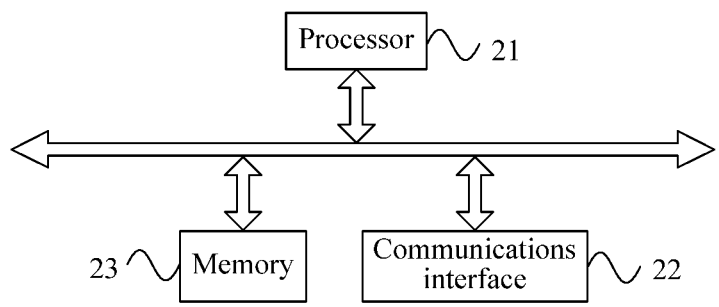
FIG. 8 is a schematic structural diagram of Embodiment 3 of a server according to the present disclosure.

FIG. 8 is a schematic structural diagram of Embodiment 3 of a server according to the present disclosure. As shown in FIG. 8, the server in this embodiment is used as a first server and may include a processor 21, a communications interface 22, a memory 23, a bus, and the like. The processor 21, the communications interface 22, and the memory 23 are connected to each other using the bus and complete communication between each other. The bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus, and the like. For convenience of indication, in FIG. 8, only one thick line is used to indicate the bus, but it does not indicate that there is only one bus or one type of bus.

The memory 23 is configured to store a program. Further, the program may include program code, and the program code includes a computer operation instruction. The memory 23 may include a high-speed random access memory (RAM), and may further include a non-volatile memory, such as at least one magnetic disk memory. The communications interface 22 is configured to communicate with an external device, and the communications interface 22 may be a universal serial bus (USB) interface, a video graphics array (VGA) interface, a network cable interface, or the like.

The processor 21 may be a central processing unit (CPU) or an application-specific integrated circuit (ASIC), or is configured as one or more integrated circuits that implement the embodiment of the present disclosure.

The processor 21 is configured to execute the program stored in the memory 23 in order to control the communications interface 22 to send a login request message to a switch, where the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server by the first VM belongs to the port group of the first VM, and the login request message is used to enable the switch to establish a correspondence between the first identifier and the WWGN, and send, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone, and control the communications interface 22 to receive a login response message sent by the switch, where the login response message is used to notify the first server that the switch has successfully received the login request message.

Optionally, after the first VM is migrated from the first server to a second server, the processor 21 is further configured to control the communications interface 22 to send a go-offline request message to the switch, where the go-offline request message includes the first identifier, and the go-offline request message is used to enable the switch to delete the correspondence between the first identifier and the WWGN, and send the first identifier and the WWGN to the storage device such that the storage device deletes the correspondence between the first identifier and the WWGN, and control the communications interface 22 to receive a go-offline response message sent by the switch, where the go-offline response message is used to notify the first server that the switch has successfully received the go-offline request message. The processor 21 is further configured to delete the first VM according to the go-offline response message.

The server in this embodiment may be configured to perform a technical solution performed by the first server in the embodiment of the shown method described above in the present disclosure, and implementation principles and technical effects thereof are similar.

Figure 9:
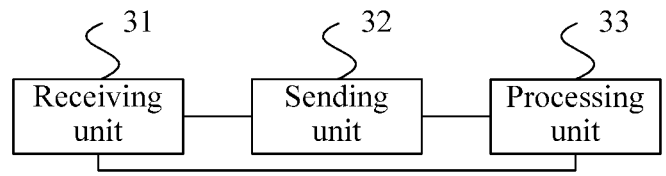
FIG. 9 is a schematic structural diagram of Embodiment 1 of a switch according to the present disclosure.

FIG. 9 is a schematic structural diagram of Embodiment 1 of a switch according to the present disclosure. As shown in FIG. 9, the switch in this embodiment may include a receiving unit 31, a sending unit 32, and a processing unit 33, where the receiving unit 31 is configured to receive a login request message sent by a first server, where the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server, of the first VM belongs to the port group of the first VM. The sending unit 32 is configured to send a login response message to the first server, where the login response message is used to notify the first server that the switch has successfully received the login request message, and the processing unit 33 is configured to establish a correspondence between the first identifier and the WWGN according to the login request message, where the sending unit 32 is further configured to send, according to a configuration of a first zone, the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone.

Optionally, when the first identifier and the WWGN are sent, according to the configuration of the first zone, to the storage device belonging to the first zone, the sending unit 32 is further configured to send a first state change notification message to the storage device according to the configuration of the first zone, where the first state change notification message is used to notify the storage device that an N_port in the FC SAN is updated. The receiving unit 31 is further configured to receive a first acquiring request message sent by the storage device, where the first acquiring request message is used to acquire an identifier of a VM belonging to the first zone, and the sending unit 32 is further configured to send a first acquiring response message to the storage device according to the first acquiring request message, the configuration of the first zone, and an identifier(s) corresponding to the WWGN, where the first acquiring response message includes the identifier(s) corresponding to the WWGN, and the identifier(s) corresponding to the WWGN includes the first identifier, and send the WWGN to the storage device such that the storage device establishes the correspondence between the first identifier and the WWGN.

Optionally, the receiving unit 31 is further configured to receive a second acquiring request message sent by the storage device before the sending unit 32 sends the WWGN to the storage device, where the second acquiring request message includes the first identifier, and the second acquiring request message is used to acquire the WWGN corresponding to the first identifier, and the sending unit 32 is further configured to send a second acquiring response message including the WWGN to the storage device according to the correspondence that is established by the processing unit 33 and that is between the first identifier and the WWGN.

Optionally, the first acquiring response message sent by the sending unit 32 further includes a control field of each identifier of the identifier(s) corresponding to the WWGN, each control field includes a port group attribute support bit, and the port group attribute support bit is used to indicate whether an N_port corresponding to each identifier supports a port group attribute such that when the first N_port of the first VM corresponding to the first identifier supports the port group attribute, the storage device sends the second acquiring request message to the switch.

Optionally, if the first VM is migrated from a second server to the first server, the receiving unit 31 is further configured to receive a go-offline request message sent by the second server after the sending unit 32 sends the WWGN to the storage device, where the go-offline request message includes a second identifier of the first VM, and the second identifier includes at least one of a WWPN of a second N_port of the first VM or an identifier of the second N_port of the first VM, and the second N_port is an N_port used on the second server by the first VM, and the sending unit 32 is further configured to send a go-offline response message to the second server, where the go-offline response message is used to notify the second server that the switch has successfully received the go-offline request message. The processing unit 33 is further configured to delete a correspondence between the second identifier and the WWGN according to the go-offline request message, where the correspondence between the second identifier and the WWGN is established by the switch when the first VM accesses the FC SAN using the second server. The sending unit 32 is further configured to send a second state change notification message to the storage device according to the configuration of the first zone, where the second state change notification message is used to notify the storage device that an N_port in the FC SAN is updated. The receiving unit 31 is further configured to receive a third acquiring request message sent by the storage device, where the third acquiring request message is used to acquire an identifier of a VM belonging to the first zone, and the sending unit 32 is further configured to send a third acquiring response message to the storage device according to the correspondence between the WWGN and the first identifier, where the third acquiring response message includes the first identifier, and the third acquiring response message is used to enable the storage device to compare the first identifier with identifier(s) of the VM(s) belonging to the first zone and stored by the storage device in order to determine that the second identifier is an identifier of a VM corresponding to an N_port leaving the FC SAN, and delete the correspondence between the second identifier and the WWGN.

The switch in this embodiment may be configured to perform a technical solution performed by the switch in the embodiment of the shown method described above in the present disclosure, and implementation principles and technical effects thereof are similar.

Figure 10:
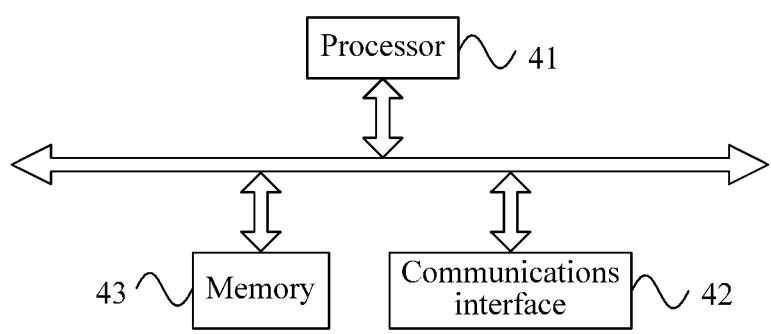
FIG. 10 is a schematic structural diagram of Embodiment 2 of a switch according to the present disclosure.

FIG. 10 is a schematic structural diagram of Embodiment 2 of a switch according to the present disclosure. As shown in FIG. 10, the switch in this embodiment may include a processor 41, a communications interface 42, a memory 43, a bus, and the like. The processor 41, the communications interface 42, and the memory 43 are connected to each other using the bus and complete communication between each other. The bus may be an ISA bus, a PCI bus, an EISA bus, or the like. The bus may be classified into an address bus, a data bus, a control bus, and the like. For convenience of indication, in FIG. 10, only one thick line is used to indicate the bus, but it does not indicate that there is only one bus or one type of bus.

The memory 43 is configured to store a program. Further, the program may include program code, and the program code includes a computer operation instruction. The memory 43 may include a high-speed RAM, and may further include a non-volatile memory, such as at least one magnetic disk memory. The communications interface 42 is configured to communicate with an external device, and the communications interface 42 may be a USB interface, a VGA interface a network cable interface, or the like.

The processor 41 may be a CPU, or an ASIC, or is configured as one or more integrated circuits that implement the embodiment of the present disclosure.

The processor 41 is configured to execute the program stored in the memory 43 in order to control the communications interface 42 to receive a login request message sent by a first server, and control the communications interface 42 to send a login response message to the first server, where the login response message is used to notify the first server that the switch has successfully received the login request message, and the login request message includes a first identifier of a first VM and a WWGN of a port group of the first VM, the first identifier includes at least one of a WWPN of a first N_port of the first VM or an identifier of the first N_port of the first VM, the first N_port is an N_port that is used on the first server by the first VM, and an N_port that is used on any server, of the first VM belongs to the port group of the first VM, and establish a correspondence between the first identifier and the WWGN according to the login request message, and control, according to a configuration of a first zone, the communications interface 42 to send the first identifier and the WWGN to a storage device belonging to the first zone such that the storage device establishes the correspondence between the first identifier and the WWGN, where the configuration of the first zone includes the WWGN and a WWPN of an N_port of the storage device, and the configuration of the first zone is used to indicate that the first VM corresponding to the WWGN and the storage device belong to the first zone.

Optionally, controlling, by the processor 41 according to a configuration of a first zone, the communications interface 42 to send the first identifier and the WWGN to a storage device belonging to the first zone includes controlling, by the processor 41 according to the configuration of the first zone, the communications interface 42 to send a first state change notification message to the storage device, where the first state change notification message is used to notify the storage device that an N_port in the FC SAN is updated, controlling the communications interface 42 to receive a first acquiring request message sent by the storage device, where the first acquiring request message is used to acquire an identifier of a VM belonging to the first zone, and controlling, according to the first acquiring request message, the configuration of the first zone, and an identifier(s) corresponding to the WWGN, the communications interface 42 to send a first acquiring response message to the storage device, where the first acquiring response message includes the identifier(s) corresponding to the WWGN, and the identifier(s) corresponding to the WWGN includes the first identifier, and controlling the communications interface 42 to send the WWGN to the storage device such that the storage device establishes the correspondence between the first identifier and the WWGN.

Optionally, before controlling the communications interface 42 to send the WWGN to the storage device, the processor 41 is further configured to control the communications interface 42 to receive a second acquiring request message sent by the storage device, where the second acquiring request message includes the first identifier, and the second acquiring request message is used to acquire the WWGN corresponding to the first identifier, and controlling, by the processor 41, the communications interface 42 to send the WWGN to the storage device includes controlling, by the processor 41 according to the correspondence between the first identifier and the WWGN, the communications interface 42 to send a second acquiring response message including the WWGN to the storage device.

Optionally, the first acquiring response message further includes a control field of each identifier of the identifier(s) corresponding to the WWGN, each control field includes a port group attribute support bit, and the port group attribute support bit is used to indicate whether an N_port corresponding to each identifier supports a port group attribute such that when the first N_port of the first VM corresponding to the first identifier supports the port group attribute, the storage device sends the second acquiring request message to the switch.

Optionally, if the first VM is migrated from a second server to the first server, after controlling the communications interface 42 to send the WWGN to the storage device, the processor 41 is further configured to control the communications interface 42 to receive a go-offline request message sent by the second server, where the go-offline request message includes a second identifier of the first VM, and the second identifier includes at least one of a WWPN of a second N_port of the first VM or an identifier of the second N_port of the first VM, and send a go-offline response message to the second server, where the second N_port is an N_port used on the second server by the first VM, and the go-offline response message is used to notify the second server that the switch has successfully received the go-offline request message, and delete a correspondence between the second identifier and the WWGN according to the go-offline request message, where the correspondence between the second identifier and the WWGN is established by the switch when the first VM accesses the FC SAN using the second server, control, according to the configuration of the first zone, the communications interface 42 to send a second state change notification message to the storage device, where the second state change notification message is used to notify the storage device that an N_port in the FC SAN is updated, control the communications interface 42 to receive a third acquiring request message sent by the storage device, where the third acquiring request message is used to acquire an identifier of a VM belonging to the first zone, and control, according to the correspondence between the WWGN and the first identifier, the communications interface 42 to send a third acquiring response message to the storage device, where the third acquiring response message includes the first identifier, and the third acquiring response message is used to enable the storage device to compare the first identifier with identifier(s) of the VM(s) belonging to the first zone and stored by the storage device in order to determine that the second identifier is an identifier of a VM corresponding to an N_port leaving the FC SAN, and delete the correspondence between the second identifier and the WWGN.

The switch in this embodiment may be configured to perform a technical solution performed by the switch in the embodiment of the shown method described above in the present disclosure, and implementation principles and technical effects thereof are similar.

Figure 11:
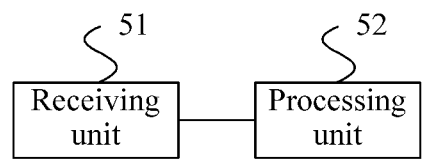
FIG. 11 is a schematic structural diagram of Embodiment 1 of a storage device according to the present disclosure.

FIG. 11 is a schematic structural diagram of Embodiment 1 of a storage device according to the present disclosure. As shown in FIG. 11, the storage device in this embodiment belongs to a first zone, and may include a receiving unit 51 and a processing unit 52, where the receiving unit 51 is configured to receive a first identifier of a first VM and a WWGN of a port group of the first VM that are sent by a switch according to a configuration of the first zone, where the first identifier includes at least one of a WWPN of a first N_port of the first VM or an identifier of the first N_port of the first VM. The first N_port is an N_port used on a first server by the first VM, and the configuration of the first zone includes the WWGN and a WWPN of an N_port of the storage device, and the configuration of the first zone is used to indicate that the first VM corresponding to the WWGN and the storage device belong to the first zone, and the processing unit 52 is configured to establish a correspondence between the first identifier and the WWGN.

The storage device in this embodiment may be configured to perform a technical solution performed by the storage device in the embodiment of the shown method described above in the present disclosure, implementation principles and technical effects thereof are similar, and details are not described herein again.

Figure 12:
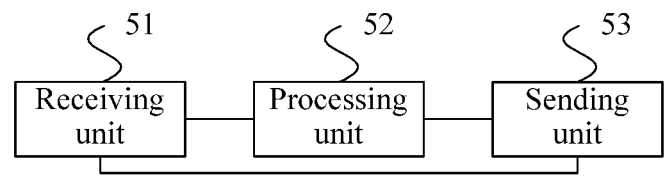
FIG. 12 is a schematic structural diagram of Embodiment 2 of a storage device according to the present disclosure.

FIG. 12 is a schematic structural diagram of Embodiment 2 of a storage device according to the present disclosure. As shown in FIG. 12, on the basis of a structure of the storage device shown in FIG. 11, the storage device in this embodiment may further include a sending unit 53, where when the first identifier of the first VM and the WWGN of the port group of the first VM that are sent by the switch according to the configuration of the first zone are received, the receiving unit 51 is further configured to receive a first state change notification message that is sent by the switch according to the configuration of the first zone, where the first state change notification message is used to notify the storage device that an N_port in the FC SAN is updated. The sending unit 53 is configured to send a first acquiring request message to the switch according to the first state change notification message received by the receiving unit 51, where the first acquiring request message is used to acquire an identifier of a VM belonging to the first zone. The receiving unit 51 is further configured to receive a first acquiring response message that is sent by the switch according to the first acquiring request message, the configuration of the first zone, and an identifier(s) corresponding to the WWGN, where the first acquiring response message includes the identifier(s) corresponding to the WWGN, and the identifier(s) corresponding to the WWGN includes the first identifier. The processing unit 52 is further configured to compare the identifier(s) corresponding to the WWGN with a stored identifier of the VM belonging to the first zone in order to determine that the first identifier is an identifier of a VM corresponding to an N_port newly accessing the FC SAN, and the receiving unit 51 is further configured to receive the WWGN sent by the switch.

Optionally, after the processing unit 52 compares the identifier(s) corresponding to the WWGN with identifier(s) of the VM(s) belonging to the first zone and stored by the storage device in order to determine that the first identifier is the identifier of the VM corresponding to the N_port newly accessing the FC SAN, the sending unit 53 is further configured to send a second acquiring request message to the switch, where the second acquiring request message includes the first identifier, and the second acquiring request message is used to acquire the WWGN corresponding to the first identifier, and the receiving unit 51 is further configured to receive a second acquiring response message that includes the WWGN and that is sent by the switch according to the correspondence between the WWGN and the first identifier.

Optionally, the first acquiring response message received by the receiving unit 51 further includes a control field of each identifier of the identifier(s) corresponding to the WWGN, each control field includes a port group attribute support bit, and the port group attribute support bit is used to indicate whether an N_port corresponding to each identifier supports a port group attribute, and the sending unit 53 is further configured to send the second acquiring request message to the switch when the first N_port of the first VM corresponding to the first identifier supports the port group attribute.

Optionally, after comparing the identifier(s) corresponding to the WWGN with identifier(s) of the VM(s) belonging to the first zone and stored by the storage device in order to determine that the first identifier is the identifier of the VM corresponding to the N_port newly accessing the FC SAN, the processing unit 52 is further configured to update, according to the first identifier, the stored identifier of the VM belonging to the first zone.

Optionally, the processing unit 52 is further configured to establish a correspondence between the WWGN and at least one LUN after establishing the correspondence between the first identifier and the WWGN if the first VM accesses the FC SAN for the first time, where the at least one LUN is used to indicate a logical unit that is accessible to the first VM corresponding to the WWGN.

Optionally, if the first VM is migrated from a second server to the first server, and after the processing unit 52 establishes the correspondence between the first identifier and the WWGN, the receiving unit 51 is further configured to receive a second state change notification message that is sent by the switch according to the configuration of the first zone, where the second state change notification message is used to notify the storage device that an N_port in the FC SAN is updated. The sending unit 53 is further configured to send a third acquiring request message to the switch according to the second state change notification message, where the third acquiring request message is used to acquire an identifier of a VM belonging to the first zone. The receiving unit 51 is further configured to receive a third acquiring response message that is sent by the switch according to the configuration of the first zone and the correspondence between the WWGN and the first identifier, where the third acquiring response message includes the first identifier, and the processing unit 52 is further configured to compare the updated and stored identifiers of the VM belonging to the first zone with the first identifier included in the third acquiring response message in order to determine that a second identifier is an identifier of a VM corresponding to an N_port leaving the FC SAN, where the updated and stored identifiers of the VM belonging to the first zone include the first identifier and the second identifier, the second identifier includes at least one of a WWPN of a second N_port of the first VM or an identifier of the second N_port of the first VM, and the second N_port is an N_port used on the second server by the first VM, and delete a correspondence between the second identifier and the WWGN, where the correspondence between the second identifier and the WWGN is established by the storage device when the first VM accesses the FC SAN using the second server.

The storage device in this embodiment may be configured to perform a technical solution performed by the storage device in the embodiment of the shown method described above in the present disclosure, implementation principles and technical effects thereof are similar, and details are not described herein again.

Figure 13:
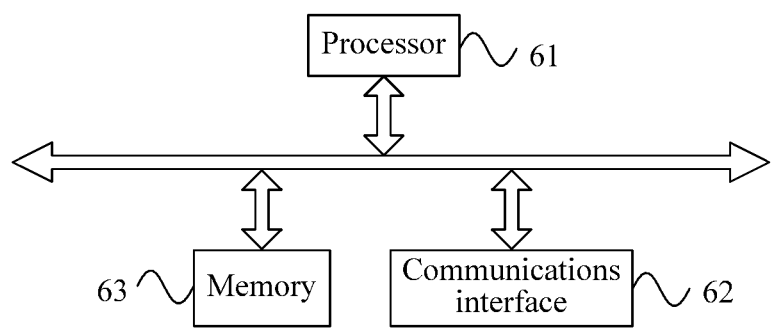
FIG. 13 is a schematic structural diagram of Embodiment 3 of a storage device according to the present disclosure.

FIG. 13 is a schematic structural diagram of Embodiment 3 of a storage device according to the present disclosure. As shown in FIG. 13, the storage device in this embodiment belongs to a first zone, and may include a processor 61, a communications interface 62, a memory 63, a bus, and the like. The processor 61, the communications interface 62, and the memory 63 are connected to each other using the bus and complete communication between each other. The bus may be an ISA bus, a PCI bus, an EISA bus, or the like. The bus may be classified into an address bus, a data bus, a control bus, and the like. For convenience of indication, in FIG. 13, only one thick line is used to indicate the bus, but it does not indicate that there is only one bus or one type of bus.

The memory 63 is configured to store a program. Further, the program may include program code, and the program code includes a computer operation instruction. The memory 63 may include a high-speed RAM, and may further include a non-volatile memory, such as at least one magnetic disk memory. The communications interface 62 is configured to communicate with an external device, and the communications interface 62 may be a USB interface, a VGA interface, a network cable interface, or the like.

The processor 61 may be a CPU, or an ASIC, or is configured as one or more integrated circuits that implement the embodiment of the present disclosure.

The processor 61 is configured to execute the program stored in the memory 63 in order to control the communications interface 62 to receive a first identifier of a first VM and a WWGN of a port group of the first VM that are sent by a switch according to a configuration of the first zone, where the first identifier includes at least one of a WWPN of a first N_port of the first VM or an identifier of the first N_port of the first VM, the first N_port is an N_port used on a first server by the first VM, and the configuration of the first zone includes the WWGN and a WWPN of an N_port of the storage device, and the configuration of the first zone is used to indicate that the first VM corresponding to the WWGN and the storage device belong to the first zone, and establish a correspondence between the first identifier and the WWGN.

Optionally, controlling, by the processor 61, the communications interface 62 to receive a first identifier of a first VM and a WWGN of a port group of the first VM that are sent by a switch according to a configuration of the first zone includes controlling, by the processor 61, the communications interface 62 to receive a first state change notification message that is sent by the switch according to the configuration of the first zone, where the first state change notification message is used to notify the storage device that an N_port in the FC SAN is updated, controlling, according to the first state change notification message, the communications interface 62 to send a first acquiring request message to the switch, where the first acquiring request message is used to acquire an identifier of a VM belonging to the first zone, and controlling the communications interface 62 to receive a first acquiring response message that is sent by the switch according to the first acquiring request message, the configuration of the first zone, and an identifier(s) corresponding to the WWGN, where the first acquiring response message includes the identifier(s) corresponding to the WWGN, the identifier(s) corresponding to the WWGN includes the first identifier, and compare the identifier(s) corresponding to the WWGN with a stored identifier of the VM belonging to the first zone in order to determine that the first identifier is an identifier of a VM corresponding to an N_port newly accessing the FC SAN, and controlling the communications interface 62 to receive the WWGN sent by the switch.

Optionally, after comparing the identifier(s) corresponding to the WWGN with identifier(s) of the VM(s) belonging to the first zone and stored by the storage device in order to determine that the first identifier is the identifier of the VM corresponding to the N_port newly accessing the FC SAN, the processor 61 is further configured to control the communications interface 62 to send a second acquiring request message to the switch, where the second acquiring request message includes the first identifier, and the second acquiring request message is used to acquire the WWGN corresponding to the first identifier, and controlling, by the processor 61, the communications interface 62 to receive the WWGN sent by the switch includes controlling, by the processor 61, the communications interface 62 to receive a second acquiring response message that includes the WWGN and that is sent by the switch according to the correspondence between the WWGN and the first identifier.

Optionally, the first acquiring response message further includes a control field of each identifier of the identifier(s) corresponding to the WWGN, each control field includes a port group attribute support bit, and the port group attribute support bit is used to indicate whether an N_port corresponding to each identifier supports a port group attribute, and controlling, by the processor 61, the communications interface 62 to send a second acquiring request message to the switch includes controlling, by the processor 61, the communications interface 62 to send the second acquiring request message to the switch when the first N_port of the first VM corresponding to the first identifier supports the port group attribute.

Optionally, after comparing the identifier(s) corresponding to the WWGN with identifier(s) of the VM(s) belonging to the first zone and stored by the storage device in order to determine that the first identifier is the identifier of the VM corresponding to the N_port newly accessing the FC SAN, the processor 61 is further configured to update, according to the first identifier, the stored identifier of the VM belonging to the first zone.

Optionally, if the first VM accesses the FC SAN for the first time, the processor 61 is further configured to establish a correspondence between the WWGN and at least one LUN after establishing the correspondence between the first identifier and the WWGN, where the at least one LUN is used to indicate a logical unit that is accessible to the first VM corresponding to the WWGN.

Optionally, if the first VM is migrated from a second server to the first server, and after establishing the correspondence between the first identifier and the WWGN, the processor 61 is further configured to control the communications interface 62 to receive a second state change notification message that is sent by the switch according to the configuration of the first zone, where the second state change notification message is used to notify the storage device that an N_port in the FC SAN is updated, control, according to the second state change notification message, the communications interface 62 to send a third acquiring request message to the switch, where the third acquiring request message is used to acquire an identifier of a VM belonging to the first zone, and control the communications interface 62 to receive a third acquiring response message that is sent by the switch according to the configuration of the first zone and the correspondence between the WWGN and the first identifier, where the third acquiring response message includes the first identifier. The processor 61 is further configured to compare the updated and stored identifiers of the VM belonging to the first zone with the first identifier included in the third acquiring response message in order to determine that a second identifier is an identifier of a VM corresponding to an N_port leaving the FC SAN, where the updated and stored identifiers of the VM belonging to the first zone include the first identifier and the second identifier, the second identifier includes at least one of a WWPN of a second N_port of the first VM or an identifier of the second N_port of the first VM, and the second N_port is an N_port used on the second server by the first VM, and delete a correspondence between the second identifier and the WWGN, where the correspondence between the second identifier and the WWGN is established by the storage device when the first VM accesses the FC SAN using the second server.

The storage device in this embodiment may be configured to perform a technical solution performed by the storage device in the embodiment of the shown method described above in the present disclosure, implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for configuring a fibre channel (FC) storage area network (SAN), comprising:

receiving, by a switch, a login request message from a first server;

sending a login response message notifying the first server that the switch has successfully received the login request message, wherein the login request message comprises a first identifier of a first virtual machine (VM) and a world wide group name (WWGN) of a port group of the first VM, wherein the first identifier comprises at least one of a world wide port name (WWPN) of a first N_port of the first VM or an identifier of the first N_port of the first VM, wherein the first N_port is an N_port used on the first server by the first VM, and wherein each N port of multiple N ports generated by performing virtualization and used on any server of the first VM belongs to the port group of the first VM, wherein the port group comprises a set of WWPNs of one or more N ports used by the first VM in a migration, and wherein N port members of the same port group are inaccessible to each other;

establishing, by the switch, a correspondence between the first identifier and the WWGN according to the login request message; and sending, by the switch according to a configuration including partition of a first zone, the first identifier and the WWGN to a storage device belonging to the first zone.

2. The method according to claim 1, wherein sending the first identifier and the WWGN to the storage device belonging to the first zone comprises:

sending, by the switch, according to the configuration of the first zone, a first state change notification message notifying the storage device that an N_port in the FC SAN is updated;

receiving, by the switch, a first acquiring request message from the storage device, wherein the first acquiring request message acquires an identifier of a VM belonging to the first zone;

sending, by the switch, a first acquiring response message to the storage device according to the first acquiring request message, the configuration of the first zone, and at least one identifier corresponding to the WWGN, wherein the first acquiring response message comprises the at least one identifier corresponding to the WWGN, and wherein the at least one identifier corresponding to the WWGN comprises the first identifier; and sending, by the switch, the WWGN to the storage device such that the storage device establishes the correspondence between the first identifier and the WWGN.

3. The method according to claim 2, wherein before sending the WWGN to the storage device, the method further comprises receiving, by the switch, a second acquiring request message from the storage device, wherein the second acquiring request message comprises the first identifier, wherein the second acquiring request message acquires the WWGN corresponding to the first identifier, and wherein sending the WWGN to the storage device comprises sending, by the switch, a second acquiring response message comprising the WWGN to the storage device according to the correspondence between the first identifier and the WWGN.

4. The method according to claim 3, wherein the first acquiring response message further comprises a control field of each identifier of the at least one identifier corresponding to the WWGN, and wherein each control field comprises a port group attribute support bit indicating whether an N_port corresponding to each identifier supports a port group attribute.

5. The method according to claim 4, wherein when the first VM is migrated from a second server to the first server, after sending the WWGN to the storage device, the method further comprises:

receiving, by the switch, a go-offline request message from the second server, wherein the go-offline request message comprises a second identifier of the first VM, wherein the second identifier comprises at least one of a WWPN of a second N_port of the first VM or an identifier of the second N_port of the first VM, and wherein the second N_port is an N_port used on the second server by the first VM;

sending a go-offline response message notifying the second server that the switch has successfully received the go-offline request message;

deleting, by the switch, a correspondence between the second identifier and the WWGN according to the go-offline request message, wherein the correspondence between the second identifier and the WWGN is established by the switch when the first VM accesses the FC SAN using the second server;

sending, by the switch, according to the configuration of the first zone, a second state change notification message to the storage device notifying the storage device that an N_port in the FC SAN is updated;

receiving, by the switch, a third acquiring request message from the storage device, wherein the third acquiring request message acquires an identifier of a VM belonging to the first zone; and sending a third acquiring response message to the storage device according to the correspondence between the WWGN and the first identifier, wherein the third acquiring response message comprises the first identifier, and wherein the third acquiring response message enables the storage device to compare the first identifier with identifier(s) of the VM(s) belonging to the first zone and stored by the storage device in order to determine that the second identifier is an identifier of a VM corresponding to an N_port leaving the FC SAN, and delete the correspondence between the second identifier and the WWGN.

6. A method for configuring a fibre channel (FC) storage area network (SAN), comprising:

receiving, by a storage device belonging to a first zone, a first identifier of a first virtual machine (VM) and a world wide group name (WWGN) of a port group of the first VM from a switch according to a configuration of the first zone, wherein the first identifier comprises at least one of a world wide port name (WWPN) of a first N_port of the first VM or an identifier of the first N_port of the first VM, wherein the first N_port is an N_port of multiple N ports generated by performing virtualization and used on a first server by the first VM, wherein the configuration of the first zone comprises the WWGN and a WWPN of an N_port of the storage device, wherein the configuration of the first zone indicates that the first VM corresponding to the WWGN and the storage device belong to the first zone, wherein the port group comprises a set of WWPNs of one or more N_ports used by the first VM in a migration, and wherein N port members of the same port group are inaccessible to each other; and establishing, by the storage device, a correspondence between the first identifier and the WWGN.

7. The method according to claim 6, wherein receiving the first identifier of the first VM and the WWGN of the port group of the first VM comprises:

receiving, by the storage device, a first state change notification message from the switch according to the configuration of the first zone, wherein the first state change notification message notifies the storage device that an N_port in the FC SAN is updated;

sending, by the storage device, a first acquiring request message to the switch according to the first state change notification message, wherein the first acquiring request message acquires an identifier of a VM belonging to the first zone;

receiving, by the storage device, a first acquiring response message from the switch according to the first acquiring request message, the configuration of the first zone, and at least one identifier corresponding to the WWGN, wherein the first acquiring response message comprises the at least one identifier corresponding to the WWGN, and wherein the at least one identifier corresponding to the WWGN comprises the first identifier;

comparing, by the storage device, the at least one identifier corresponding to the WWGN with a stored identifier of the VM belonging to the first zone in order to determine that the first identifier is an identifier of a VM corresponding to an N_port newly accessing the FC SAN; and receiving, by the storage device, the WWGN from the switch.

8. The method according to claim 7, wherein after comparing the at least one identifier corresponding to the WWGN with the stored identifier of the VM belonging to the first zone, the method further comprises sending, by the storage device, a second acquiring request message to the switch, wherein the second acquiring request message comprises the first identifier, wherein the second acquiring request message acquires the WWGN corresponding to the first identifier, and wherein receiving, by the storage device, the WWGN from the switch comprises receiving, by the storage device, a second acquiring response message that comprises the WWGN and from the switch according to the correspondence between the WWGN and the first identifier.

9. The method according to claim 8, wherein the first acquiring response message further comprises a control field of each identifier of the at least one identifier corresponding to the WWGN, wherein each control field comprises a port group attribute support bit indicating whether an N_port corresponding to each identifier supports a port group attribute, and wherein sending the second acquiring request message to the switch comprises sending, by the storage device, the second acquiring request message to the switch when the first N_port of the first VM corresponding to the first identifier supports the port group attribute.

10. The method according to claim 9, wherein after comparing the at least one identifier corresponding to the WWGN with the stored identifier of the VM belonging to the first zone, the method further comprises updating, by the storage device according to the first identifier, the stored identifier of the VM belonging to the first zone.

11. The method according to claim 10, wherein when the first VM is migrated from a second server to the first server, after establishing the correspondence between the first identifier and the WWGN, the method further comprises:
receiving, by the storage device, a second state change notification message from the switch according to the configuration of the first zone, wherein the second state change notification message notifies the storage device that an N_port in the FC SAN is updated;
sending, by the storage device, a third acquiring request message to the switch according to the second state change notification message, wherein the third acquiring request message acquires an identifier of a VM belonging to the first zone;
receiving a third acquiring response message from the switch according to the configuration of the first zone and the correspondence between the WWGN and the first identifier, wherein the third acquiring response message comprises the first identifier;
comparing, by the storage device, the updated and stored identifiers of the VM belonging to the first zone with the first identifier comprised in the third acquiring response message in order to determine that a second identifier is an identifier of a VM corresponding to an N_port leaving the FC SAN, wherein the updated and stored identifiers of the VM belonging to the first zone comprise the first identifier and the second identifier, wherein the second identifier comprises at least one of a WWPN of a second N_port of the first VM or an identifier of the second N_port of the first VM, and wherein the second N_port is an N_port used on the second server by the first VM; and
deleting, by the storage device, a correspondence between the second identifier and the WWGN, wherein the correspondence between the second identifier and the WWGN is established by the storage device when the first VM accesses the FC SAN using the second server.

12. A switch used in a fibre channel (FC) storage area network (SAN), comprising:
a memory configured to store program codes; and
a processor coupled to the memory and configured to execute the program codes:
receive a login request message from a first server, wherein the login request message comprises a first identifier of a first virtual machine (VM) and a world wide group name (WWGN) of a port group of the first VM, wherein the first identifier comprises at least one of a world wide port name (WWPN) of a first N_port of the first VM or an identifier of the first N_port of the first VM, wherein the first N_port is an N_port used on the first server by the first VM, and wherein each N port of multiple N ports generated by performing virtualization and used on any server of the first VM belongs to the port group of the first VM, wherein the port group comprises a set of WWPNs of one or more N ports used by the first VM in a migration, and wherein N port members of the same port group are inaccessible to each other;
send a login response message notifying the first server that the switch has successfully received the login request message;
establish a correspondence between the first identifier and the WWGN according to the login request message; and
send, according to a configuration of a first zone, the first identifier and the WWGN to a storage device belonging to the first zone.

13. The switch according to claim 12, wherein when sending the first identifier and the WWGN to the storage device belonging to the first zone comprises, the processor is further configured to:
send, according to the configuration of the first zone, a first state change notification message notifying the storage device that an N_port in the FC SAN is updated;
receive a first acquiring request message from the storage device, wherein the first acquiring request message acquires an identifier of a VM belonging to the first zone;
send a first acquiring response message to the storage device according to the first acquiring request message, the configuration of the first zone, and at least one identifier corresponding to the WWGN, wherein the first acquiring response message comprises the at least one identifier corresponding to the WWGN, and wherein the at least one identifier corresponding to the WWGN comprises the first identifier; and
send the WWGN to the storage device such that the storage device establishes the correspondence between the first identifier and the WWGN.

14. The switch according to claim 13, wherein the processor is further configured to:
receive a second acquiring request message from the storage device before sending the WWGN to the storage device, wherein the second acquiring request message comprises the first identifier, and wherein the second acquiring request message acquires the WWGN corresponding to the first identifier; and
send a second acquiring response message comprising the WWGN to the storage device according to the correspondence between the first identifier and the WWGN when sending the WWGN to the storage device.

15. The switch according to claim 14, wherein the first acquiring response message further comprises a control field of each identifier of the at least one identifier corresponding to the WWGN, and wherein each control field comprises a port group attribute support bit indicating whether an N_port corresponding to each identifier supports a port group attribute.

16. The switch according to claim 15, wherein when the first VM is migrated from a second server to the first server, the processor is further configured to:
receive a go-offline request message from the second server, wherein the go-offline request message comprises a second identifier of the first VM, wherein the second identifier comprises at least one of a WWPN of a second N_port of the first VM or an identifier of the second N_port of the first VM, and wherein the second N_port is an N_port used on the second server by the first VM;

send a go-offline response message notifying the second server that the switch has successfully received the go-offline request message;

delete a correspondence between the second identifier and the WWGN according to the go-offline request message, wherein the correspondence between the second identifier and the WWGN is established by the switch when the first VM accesses the FC SAN using the second server;

send, according to the configuration of the first zone, a second state change notification message notifying the storage device that an N_port in the FC SAN is updated;

receive a third acquiring request message from the storage device, wherein the third acquiring request message acquires an identifier of a VM belonging to the first zone; and send a third acquiring response message to the storage device according to the correspondence between the WWGN and the first identifier, wherein the third acquiring response message comprises the first identifier, and wherein the third acquiring response message enables the storage device to compare the first identifier with identifier(s) of the VM(s) belonging to the first zone and stored by the storage device in order to determine that the second identifier is an identifier of a VM corresponding to an N_port leaving the FC SAN, and delete the correspondence between the second identifier and the WWGN.

17. A storage device used in a fibre channel (FC) storage area network (SAN), wherein the storage device belongs to a first zone, and comprises: a memory configured to store program codes; and a processor coupled to the memory and configured to execute the program codes:

receive a first identifier of a first virtual machine (VM) and a world wide group name (WWGN) of a port group of the first VM from a switch according to a configuration of the first zone, wherein the first identifier comprises at least one of a world wide port name (WWPN) of a first N_port of the first VM or an identifier of the first N_port of the first VM, wherein the first N_port of multiple N ports generated by performing virtualization and is an N_port used on a first server by the first VM, wherein the configuration of the first zone comprises the WWGN and a WWPN of an N_port of the storage device, wherein the configuration of the first zone indicates that the first VM corresponding to the WWGN and the storage device belong to the first zone, wherein the port group comprises a set of WWPNs of one or more N_ports used by the first VM in a migration, and wherein N port members of the same port group are inaccessible to each other; and establish a correspondence between the first identifier and the WWGN.

18. The storage device according to claim 17, wherein when receiving the first identifier of the first VM and the WWGN of the port group of the first VM, the processor is further configured to:

receive a first state change notification message from the switch according to the configuration of the first zone, wherein the first state change notification message notifies the storage device that an N_port in the FC SAN is updated;

send a first acquiring request message to the switch according to the first state change notification message, wherein the first acquiring request message acquires an identifier of a VM belonging to the first zone;

receive a first acquiring response message from the switch according to the first acquiring request message, the configuration of the first zone, and at least one identifier corresponding to the WWGN, wherein the first acquiring response message comprises the at least one identifier corresponding to the WWGN, and wherein the at least one identifier corresponding to the WWGN comprises the first identifier;

compare the at least one identifier corresponding to the WWGN with a stored identifier of the VM belonging to the first zone in order to determine that the first identifier is an identifier of a VM corresponding to an N_port newly accessing the FC SAN; and receive the WWGN from the switch.

19. The storage device according to claim 18, wherein after comparing the at least one identifier corresponding to the WWGN with the stored identifier of the VM, the processor is further configured to:

send a second acquiring request message to the switch, wherein the second acquiring request message comprises the first identifier, and wherein the second acquiring request message acquires the WWGN corresponding to the first identifier; and receive a second acquiring response message that comprises the WWGN and from the switch according to the correspondence between the WWGN and the first identifier.

20. The storage device according to claim 19, wherein the first acquiring response message further comprises a control field of each identifier of the at least one identifier corresponding to the WWGN, wherein each control field comprises a port group attribute support bit indicating whether an N_port corresponding to each identifier supports a port group attribute, and wherein the processor is further configured to send the second acquiring request message to the switch when the first N_port of the first VM corresponding to the first identifier supports the port group attribute.

* * * * *

UNITED STATES PATENT AND TRADEMARK OFFICE
CERTIFICATE OF CORRECTION

PATENT NO. : 10,644,935 B2
APPLICATION NO. : 15/410951
DATED : May 5, 2020
INVENTOR(S) : Hao Chen and Wei Song Page 1 of 1

It is certified that error appears in the above-identified patent and that said Letters Patent is hereby corrected as shown below:

In the Claims

Claim 1, Column 34, Line 40: "multiple N ports" should read "multiple N_ports"

Claim 1, Column 34, Line 45: "wherein N port" should read "wherein N_port"

Claim 6, Column 36, Line 15: "multiple N ports" should read "multiple N_ports"

Claim 6, Column 36, Line 24: "wherein N port" should read "wherein N_port"

Claim 12, Column 38, Line 4: "multiple N ports" should read "multiple N_ports"

Claim 12, Column 38, Line 9: "wherein N port" should read "wherein N_port"

Claim 17, Column 39, Line 48: "multiple N ports" should read "multiple N_ports"

Claim 17, Column 40, Line 2: "wherein N port" should read "wherein N_port"

Signed and Sealed this
Twenty-third Day of June, 2020

Andrei Iancu
*Director of the United States Patent and Trademark Office*